(12) United States Patent
Fukunaga

(10) Patent No.: US 8,908,990 B2
(45) Date of Patent: Dec. 9, 2014

(54) IMAGE PROCESSING APPARATUS, IMAGE PROCESSING METHOD, AND COMPUTER READABLE MEDIUM FOR CORRECTING A LUMINANCE VALUE OF A PIXEL FOR REDUCING IMAGE FOG

(75) Inventor: Masakazu Fukunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 397 days.

(21) Appl. No.: 13/302,839

(22) Filed: Nov. 22, 2011

(65) Prior Publication Data

US 2012/0301034 A1 Nov. 29, 2012

(30) Foreign Application Priority Data

May 25, 2011 (JP) .................. 2011-117024

(51) Int. Cl.
| | | |
|---|---|---|
| G06K 9/40 | (2006.01) | |
| G06K 9/00 | (2006.01) | |
| G09G 5/10 | (2006.01) | |
| H04N 5/202 | (2006.01) | |
| H04N 1/40 | (2006.01) | |
| H04N 1/407 | (2006.01) | |
| H04N 1/62 | (2006.01) | |

(52) U.S. Cl.
CPC . *H04N 1/407* (2013.01); *H04N 1/62* (2013.01)
USPC ........... 382/274; 382/167; 345/690; 348/254; 358/3.01

(58) Field of Classification Search
USPC .......... 382/195, 167, 274; 358/3.01; 345/690; 348/254
See application file for complete search history.

(56) References Cited

U.S. PATENT DOCUMENTS

| | | | | |
|---|---|---|---|---|
| 6,664,973 | B1 * | 12/2003 | Iwamoto et al. | 345/589 |
| 6,694,051 | B1 | 2/2004 | Yamazoe et al. | |
| 7,113,227 | B1 * | 9/2006 | Kakuya et al. | 348/678 |
| 8,310,726 | B2 * | 11/2012 | Enjuji | 358/3.01 |
| 8,351,090 | B2 * | 1/2013 | Makino | 358/474 |
| 8,515,170 | B2 * | 8/2013 | Morimoto | 382/169 |
| 2002/0021839 | A1 | 2/2002 | Takahashi | |

(Continued)

FOREIGN PATENT DOCUMENTS

| | | |
|---|---|---|
| JP | 3426189 B2 | 7/2003 |
| JP | 2005-341527 A | 12/2005 |

(Continued)

OTHER PUBLICATIONS

Office Action issued in corresponding Australian Patent Application No. 2011254014, dated Jan. 8, 2013.

*Primary Examiner* — Kathleen Y Dulaney
(74) *Attorney, Agent, or Firm* — Sugrue Mion, PLLC

(57) ABSTRACT

An image processing apparatus includes the following elements. A receiving device receives an image. An estimating device estimates, for each of pixels within the image received by the receiving device, on the basis of the received image, an amount of fog, which is a difference between a luminance value of the pixel and an original luminance value of the pixel. A measuring device measures, for each of the pixels within the image received by the receiving device, a luminance value of the pixel. A determining device determines a correction target value for luminance values of pixels of a background portion within the image received by the receiving device. A correcting device corrects the luminance value of each of the pixels measured by the measuring device on the basis of the amount of fog estimated by the estimating device and the correction target value determined by the determining device.

8 Claims, 25 Drawing Sheets

(56) References Cited

U.S. PATENT DOCUMENTS

| | | |
|---|---|---|
| 2005/0207644 A1* | 9/2005 | Kitagawara et al. .......... 382/167 |
| 2007/0229863 A1 | 10/2007 | Ono et al. |
| 2007/0236431 A1* | 10/2007 | Tada et al. ....................... 345/84 |
| 2008/0024845 A1* | 1/2008 | Makino et al. ................ 358/538 |
| 2010/0020341 A1 | 1/2010 | Enjuji |
| 2010/0027072 A1* | 2/2010 | Enjuji .......................... 358/3.01 |
| 2010/0329553 A1* | 12/2010 | Shiokawa et al. ............. 382/167 |
| 2012/0026553 A1* | 2/2012 | Ozawa et al. ................ 358/3.01 |
| 2012/0127371 A1* | 5/2012 | Watanabe et al. ............. 348/687 |
| 2013/0071131 A1* | 3/2013 | Hirabayashi .................... 399/30 |

FOREIGN PATENT DOCUMENTS

| | | |
|---|---|---|
| JP | 4111697 A | 7/2008 |
| JP | 2009-290660 A | 12/2009 |
| JP | 2009-290661 A | 12/2009 |

* cited by examiner

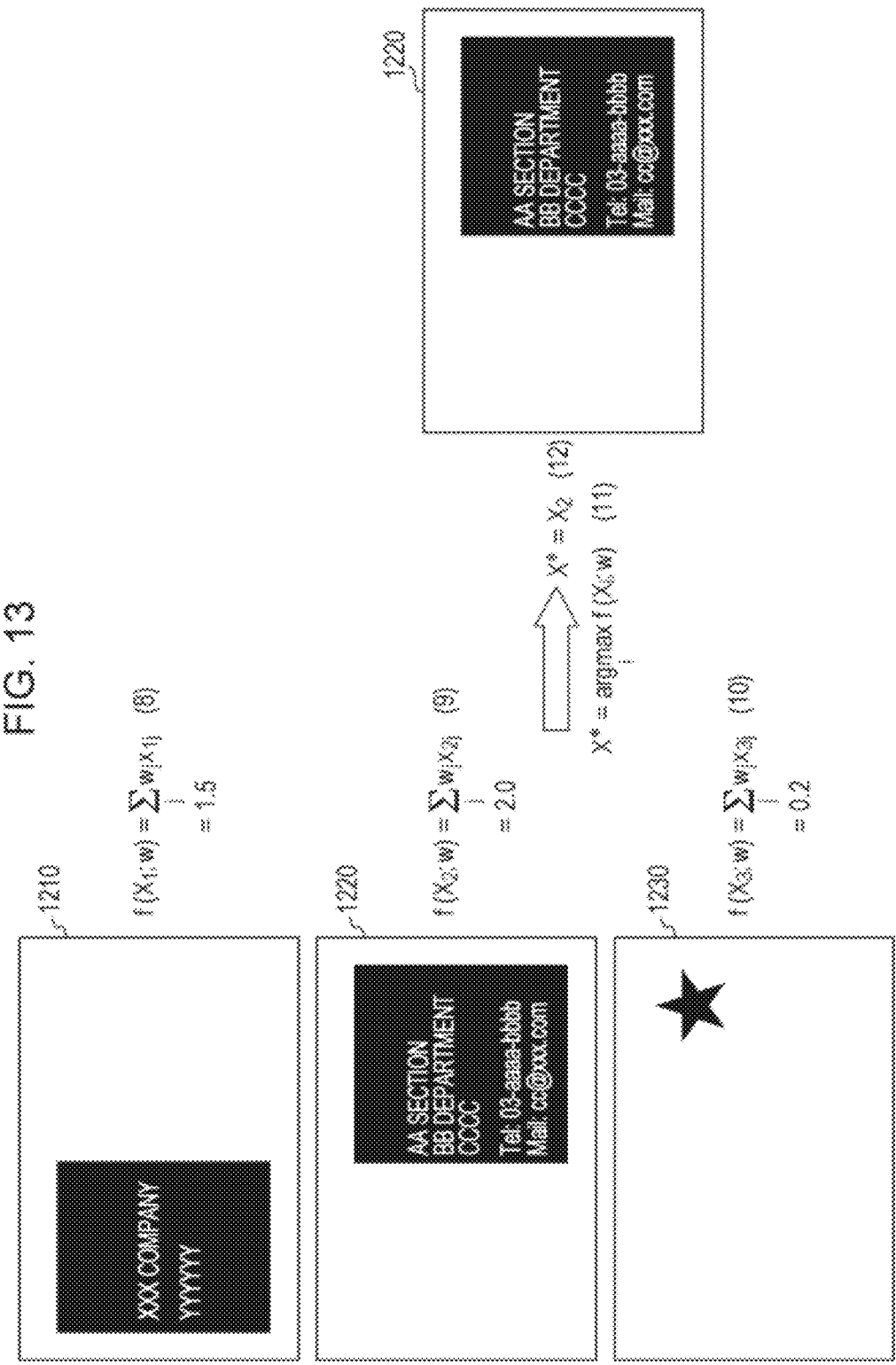

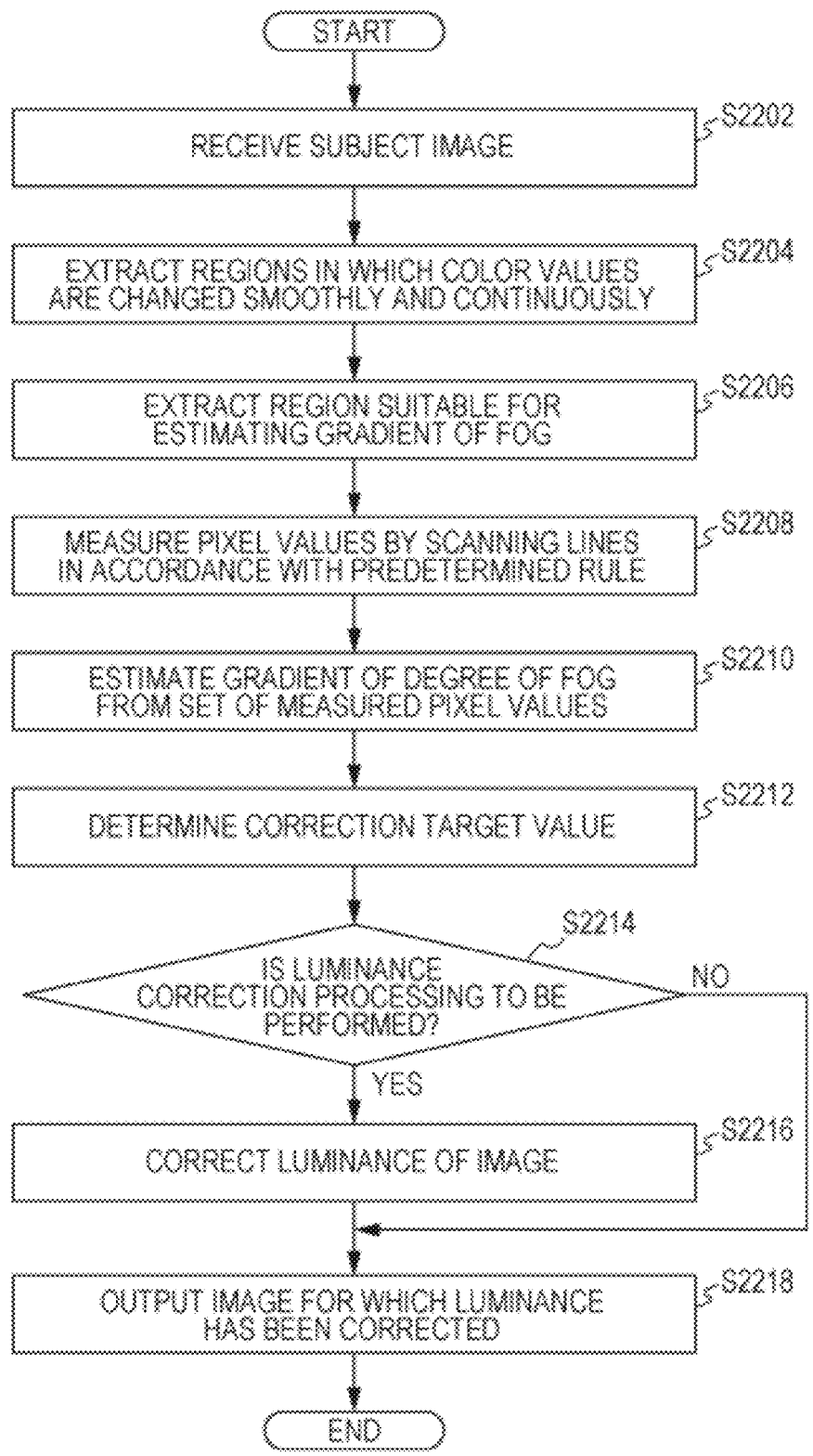

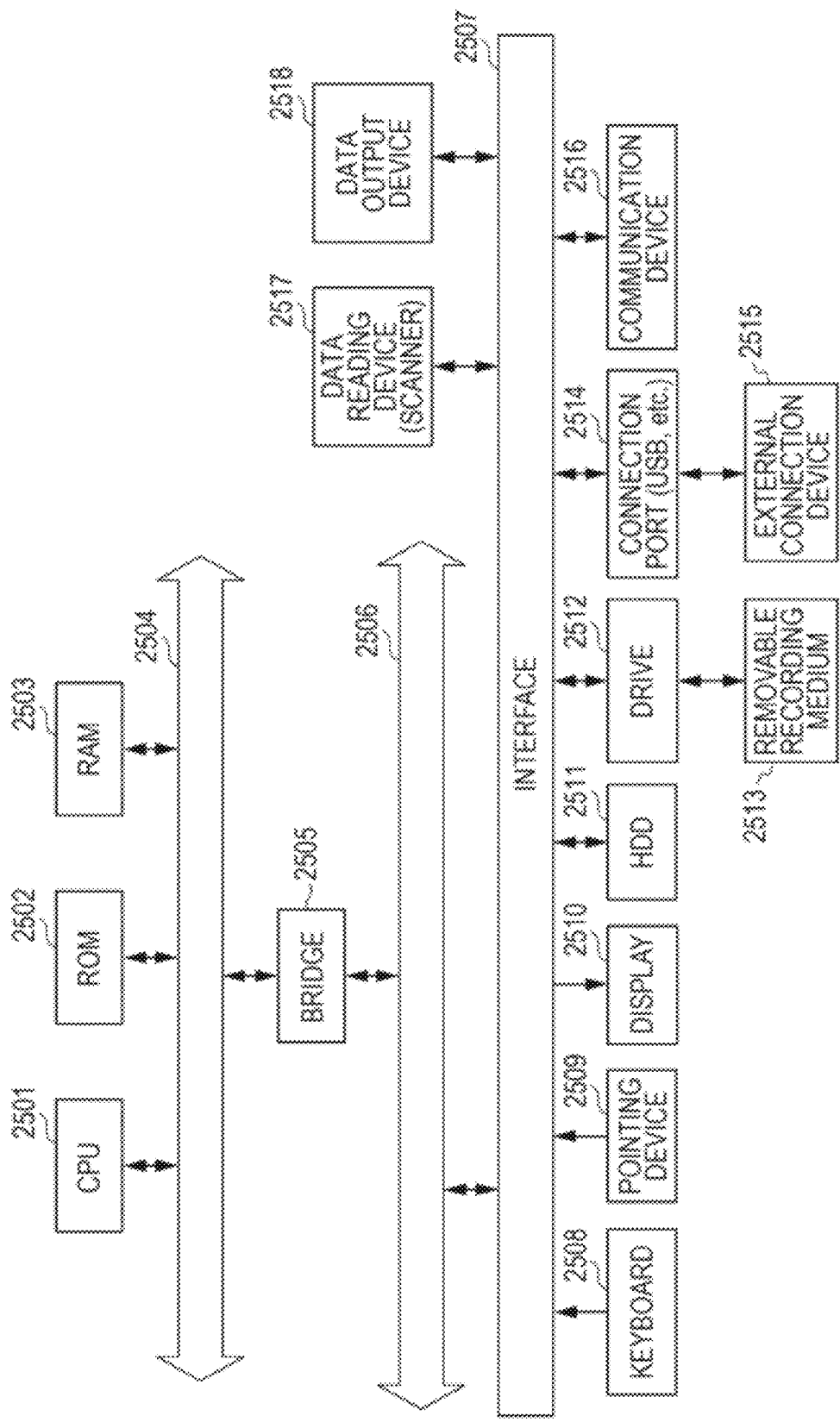

US 8,908,990 B2

IMAGE PROCESSING APPARATUS, IMAGE PROCESSING METHOD, AND COMPUTER READABLE MEDIUM FOR CORRECTING A LUMINANCE VALUE OF A PIXEL FOR REDUCING IMAGE FOG

CROSS-REFERENCE TO RELATED APPLICATIONS

This application is based on and claims priority under 35 USC 119 from Japanese Patent Application No. 2011-117024 filed May 25, 2011.

BACKGROUND

Technical Field

The present invention relates to image processing apparatuses, image processing methods, and computer readable media.

SUMMARY

According to an aspect of the invention, there is provided an image processing apparatus including: a receiving device that receives an image; an estimating device that estimates, for each of pixels within the image received by the receiving device, on the basis of the image received by the receiving device, an amount of fog, which is a difference between a luminance value of the pixel and an original luminance value of the pixel; a measuring device that measures, for each of the pixels within the image received by the receiving device, a luminance value of the pixel; a determining device that determines a correction target value for luminance values of pixels of a background portion within the image received by the receiving device; and a correcting device that corrects the luminance value of each of the pixels measured by the measuring device on the basis of the amount of fog estimated by the estimating device and the correction target value determined by the determining device.

BRIEF DESCRIPTION OF THE DRAWINGS

Exemplary embodiment(s) of the present invention will be described in detail based on the following figures, wherein:

FIG. 13 illustrates an example of processing performed by an inspection-region selecting module;

FIGS. 16A through 17C illustrate an example of processing performed by a pixel-value distribution estimating module;

FIG. 22 is a flowchart illustrating an example of processing according to the fourth exemplary embodiment;

FIG. 25 is a block diagram illustrating an example of the hardware configuration of a computer implementing the exemplary embodiments.

DETAILED DESCRIPTION

In order to facilitate the understanding of exemplary embodiments of the invention, a technology, which is a basis for the exemplary embodiments, will first be described.

Figure 23E:
FIGS. 23A through 24F illustrate an example of a technology, which serves as a basis for the exemplary embodiments.
Figure 23F:
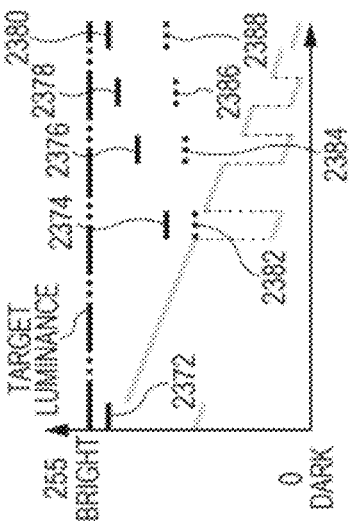
Figure 23C:
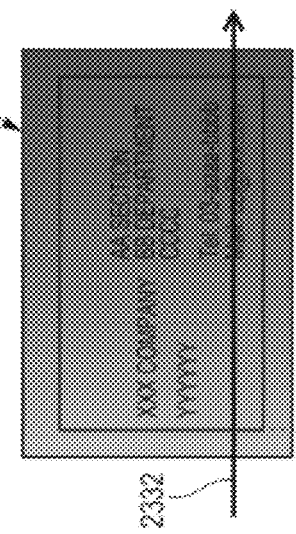
Figure 23D:
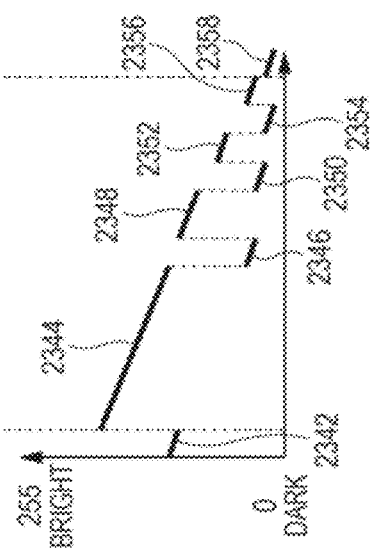
Figure 23A:
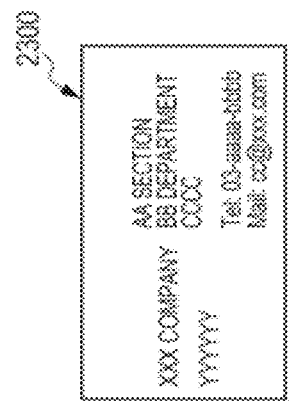

In FIG. 23A, a subject document 2300 to be photographed is a name card and is printed only in black and white.

Figure 23B:
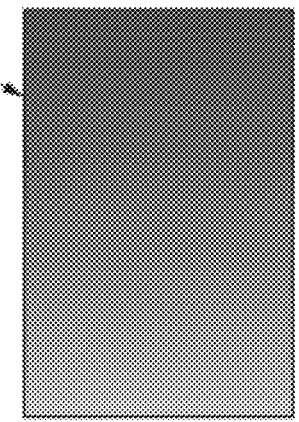

The subject document 2300 is photographed by using, for example, a digital camera, resulting in a photographed image 2330 shown in FIG. 23C. In this case, the photographed image 2330 shows that image deterioration, such as a fog image 2320 shown in FIG. 23B, has occurred and is superposed on the photographed image 2330. There are various reasons why the fog image 2320 is generated, such as non-uniformity of illumination, taking a picture facing toward the light, the position of the subject document 2300 (i.e., positional relationship among the subject document 2300, illumination, and an image capturing device), and the configuration of the lenses of a digital camera (e.g., the center portion of an image is brighter, while the peripheral portion thereof is darker). FIG. 23B shows that the fog image 2320 is a gradation image in which the right side is a dark black and the left side is a light black, i.e., the shade of the color progressively changes. Accordingly, in the photographed image 2330 shown in FIG. 23C, although the right side is a dark black, the left side is close to the image of the original subject document 2300. This fog is also referred to as "shadow" or "black fog".

Fog images may be generated, not only by the use of a digital camera, but also by the use of a scanner. For example, in a so-called flatbed scanner, a pivotable pressure plate is provided on contact glass, and after setting a document on the contact glass, the pressure plate is closed and the document is scanned. Documents to be scanned include not only sheet-like documents, but also book-like documents (books, booklets, etc.). Such a book-like document is also set on the contact glass and is scanned. However, the binding portion of such a document is elevated above the contact glass, and is separated from the focal plane. As a result, image deterioration called "fog" occurs in the resulting scanned image corresponding to a position at which the binding portion of the document has been set.

A description will now be given of exemplary embodiments of the invention with reference to the accompanying drawings.

First Exemplary Embodiment

Figure 1:
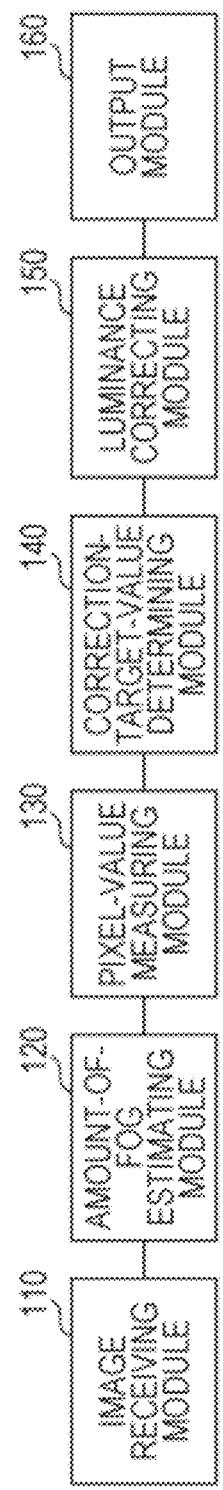
FIG. 1 is a block diagram illustrating conceptual modules forming an image processing apparatus according to a first exemplary embodiment.

FIG. 1 is a block diagram illustrating conceptual modules forming an image processing apparatus according to a first exemplary embodiment.

Generally, modules are software (computer programs) components or hardware components that can be logically separated from one another. Accordingly, the modules of exemplary embodiments of the invention are not only modules of a computer program, but also modules of a hardware configuration. Accordingly, the exemplary embodiments will also be described in the form of a computer program for allowing a computer to function as those modules (a program for causing a computer to execute program steps, a program for allowing a computer to function as corresponding units, a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program is stored in a storage device. Modules may correspond to functions based on a one-on-one relationship. In terms of implementation, however, one module may be constituted of one program, or plural modules may be constituted of one program. Conversely, one module may be constituted of plural programs. Additionally, plural modules may be executed by using a single computer, or one module may be executed by using plural computers in a distributed or parallel environment. One module may integrate another module therein. Hereinafter, the term "connection" includes, not only physical connection, but also logical connection (sending and receiving of data, giving instructions, reference relationship among data elements, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state.

A system or an apparatus may be realized by connecting plural computers, hardware units, devices, etc., one another via a communication medium, such as a network (including communication based on a one-on-one correspondence), or may be realized by a single computer, hardware unit, device, etc. The terms "apparatus" and "system" are used synonymously. The term "system" does not include merely a man-made social "mechanism" (social system).

Additionally, before performing an operation by using a corresponding module or when performing plural operations by using a corresponding module, target information is read from a storage device, and after performing the operation, a processed result is written into the storage device. Accordingly, a description of reading from the storage device before an operation or writing into the storage device after an operation may be omitted. Examples of the storage device may include a hard disk, a random access memory (RAM), an external storage medium, a storage device using a communication circuit, a register in a central processing unit (CPU), etc.

An image processing apparatus shown in FIG. 1 of the first exemplary embodiment serves the function to eliminate fog from images. The image processing apparatus shown in FIG. 1 includes by way of example an image receiving module 110, an amount-of-fog estimating module 120, a pixel-value measuring module 130, a correction-target-value determining module 140, a luminance correcting module 150, and an output module 160.

The image receiving module 110 is connected to the amount-of-fog estimating module 120. The image receiving module 110 receives an image and delivers the received image to the amount-of-fog estimating module 120. Receiving an image includes reading an image by using, for example, a scanner and a camera, receiving an image from an external device by using, for example, a fax machine, via a communication circuit, reading an image stored in a hard disk (which may be built in a computer or may be connected to the computer via a network), etc. The image is a multi-valued image (including a color image). Only one image may be received or plural images may be received. The contents of images include business documents (e.g., the above-described name cards), advertising pamphlets, images drawn on a whiteboard, etc. The image receiving module 110 may make correction for the received image by performing digital filer processing, etc., such correction including camera shake correction. An example of processing performed by the image receiving module 110 will be discussed later with reference to FIG. 3.

The amount-of-fog estimating module 120 is connected to the image receiving module 110 and the pixel-value measuring module 130. The amount-of-fog estimating module 120 estimates, for each of pixels within an image received by the image receiving module 110, on the basis of the received image, the amount of fog, which is a difference between the original luminance value of a pixel and the luminance value of the corresponding pixel of the received image. The amount-of-fog estimating module 120 then delivers the estimated amount of fog to the correction-target-value determining module 140 and the luminance correcting module 150. The amount-of-fog estimating module 120 estimates, from, for example, the distribution of the background color of a subject document to be photographed, the amount of fog and the gradient of the degree of fog at each set of coordinates. As a specific example of a technique employed in the amount-of-fog estimating module 120, the technique disclosed in Japanese Patent No. 4111697 may be applied. Typical luminance values at predetermined quantized points of an image may be generated, and an estimated luminance value at each set of coordinates may be calculated from the typical luminance values of the quantized points which surround the set of coordinates.

The pixel-value measuring module 130 is connected to the amount-of-fog estimating module 120 and the correction-target-value determining module 140. The pixel-value measuring module 130 measures luminance values of pixels within an image received by the image receiving module 110, and delivers the measured luminance values to the correction-target-value determining module 140. The pixel-value measuring module 130 measures the luminance values of the pixels by scanning the image. Concerning the scanning direction, a scanning operation comparable to that performed by a pixel-value measuring module 840 in a third exemplary embodiment, which will be described below, may be performed.

The correction-target-value determining module 140 is connected to the pixel-value measuring module 130 and the luminance correcting module 150. The correction-targetvalue determining module 140 determines a correction target value for the luminance values in the background of an image received by the image receiving module 110. The correction-target-value determining module 140 then delivers the determined correction target value to the luminance correcting module 150. The correction-target-value determining module 140 determines, from the amount of fog estimated by the amount-of-fog estimating module 120, a correction target value for the luminance values when it is assumed that the entire surface of the received image is the background of the document. Alternatively, the correction-target-value determining module 140 may set a fixed correction target value in advance, or determine a correction target value by calculating luminance values of pixels that satisfy a predetermined condition from the luminance distribution of fog. More specifically, the luminance values of the pixels within a received image are collected so as to generate a luminance histogram. Then, in the luminance histogram, the luminance value of pixels that satisfy a predetermined condition (e.g., pixels having the luminance value lower than the brightest luminance by 10%) may be set as the correction target value. Alternatively, an operator may set a luminance value as the correction target value.

The luminance correcting module 150 is connected to the correction-target-value determining module 140 and the output module 160. The luminance correcting module 150 corrects the luminance values measured by the pixel-value measuring module 130 on the basis of the amount of fog estimated by the amount-of-fog estimating module 120 (hereinafter also referred to as the "estimated luminance values") and the correction target value determined by the correction-target-value determining module 140. The luminance correcting module 150 then delivers an image for which the luminance values have been corrected to the output module 160. The image for which the luminance values have been corrected is an image from which fog has been eliminated.

The luminance correcting module 150 may set the difference between the amount of fog estimated by the amount-of-fog estimating module 120 and the correction target value determined by the correction-target-value determining module 140 to be a basic amount of correction. Then, the luminance correcting module 150 may change the basic amount of correction in accordance with a coefficient which is based on the difference between the luminance value measured by the pixel-value measuring module 130 and the amount of fog. Then, the luminance correcting module 150 may correct the measured luminance value in accordance with the changed basic amount of correction. This processing will be discussed later by using equations (1) and (2).

The above-described coefficient may be set as follows. As the difference between the luminance value measured by the pixel-value measuring module 130 and the amount of fog increases, the basic amount of correction decreases. To decrease the basic amount of correction is to increase the amount of change for the basic amount of correction, and also means that the amount of correction for the measured luminance values is smaller than that for a background portion. For example, a smaller amount of fog is eliminated from an image region than that for, for example, black characters. This processing will be discussed later by using equation (2).

If the difference between the luminance value measured by the pixel-value measuring module 130 and the amount of fog is equal to or greater than a predetermined threshold, or if the difference is greater than the predetermined threshold, the luminance correcting module 150 may not correct the luminance value. This processing will be discussed later by using equation (2).

The luminance correcting module 150 may also change the basic amount of correction by using a coefficient which is based on the basic amount of correction and the difference between the luminance value measured by the pixel-value measuring module 130 and the amount of fog. This processing will be discussed later by using equation (3).

The output module 160 is connected to the luminance correcting module 150. The output module 160 receives an image for which the luminance has been corrected by the luminance correcting module 150, and outputs the image. Outputting an image includes printing an image by using, for example, a printer, displaying an image on, for example, a display, transmitting an image by using an image transmitting apparatus, such as a fax machine, writing an image into an image storage device, such as an image database, storing an image in a storage medium, such as a memory card, delivering an image to another information processing apparatus, etc. Such an image may be output in association with the image received by the image receiving module 110.

Figure 2:
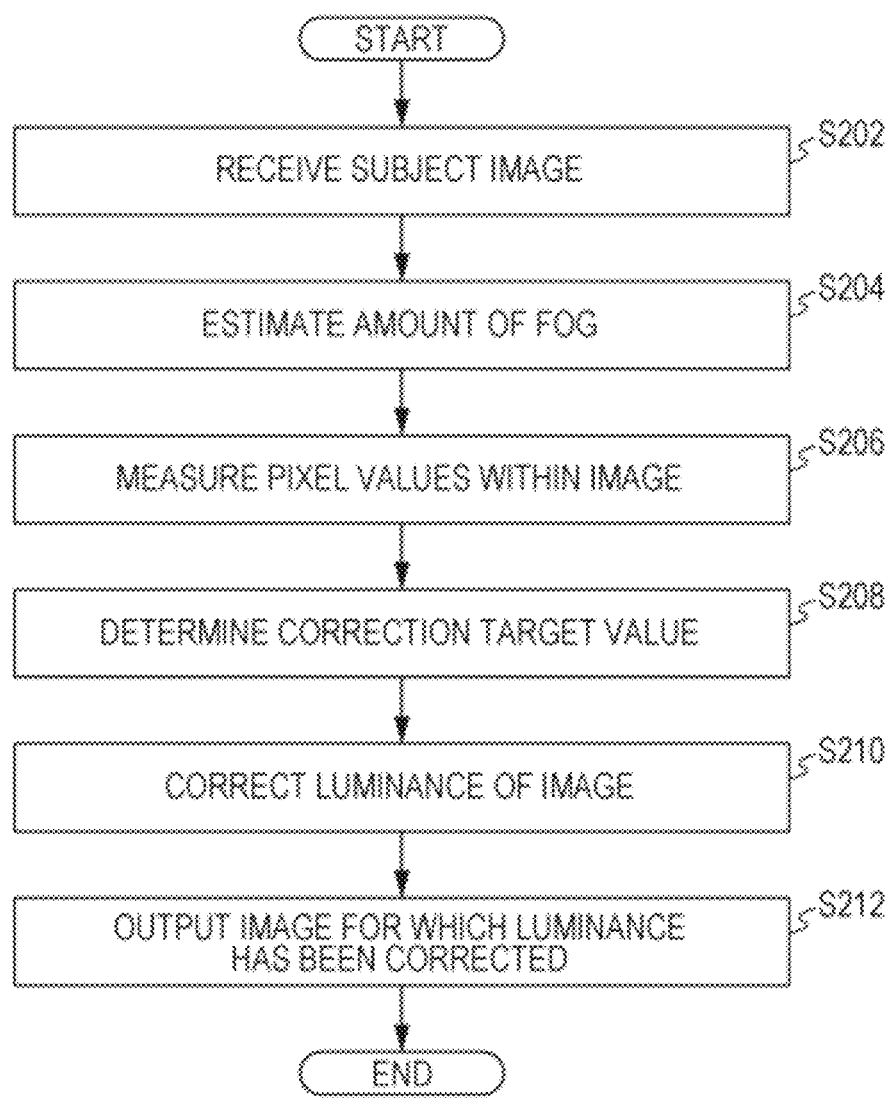
FIG. 2 is a flowchart illustrating an example of processing according to the first exemplary embodiment.

FIG. 2 is a flowchart illustrating an example of processing according to the first exemplary embodiment.

In step S202, the image receiving module 110 receives a subject image.

Figure 3:
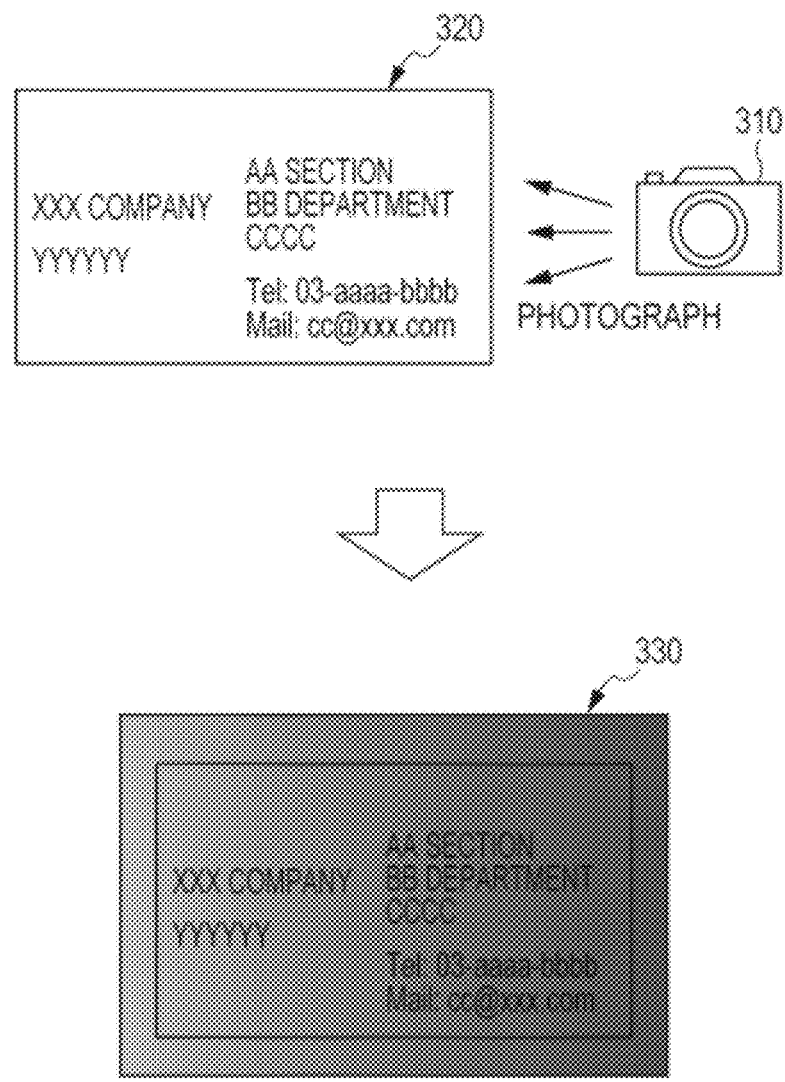
FIG. 3 illustrates an example of processing performed by an image receiving module.

FIG. 3 illustrates an example of the processing performed by the image receiving module 110. A subject document 320 to be photographed is equivalent to the subject document 2300 shown in FIG. 23A. When the subject document 320 is photographed by using an image capturing device 310, fog occurs and is reflected in a resulting image, such as that in a photographed image 330. For example, after exchanging name cards, the subject document 320 representing one of the name cards is placed on a desk and is photographed with the image capturing device 310. The image capturing device 310 may be an independent digital camera, a digital camera built in a personal digital assistant e.g., in a cellular phone including a smartphone, or a scanner, etc.

In step S204, the amount-of-fog estimating module 120 estimates the amount of fog.

In step S206, the pixel-value measuring module 130 measures pixel values within an image.

In step S208, the correction-target-value determining module 140 determines a correction target value.

Figure 4:
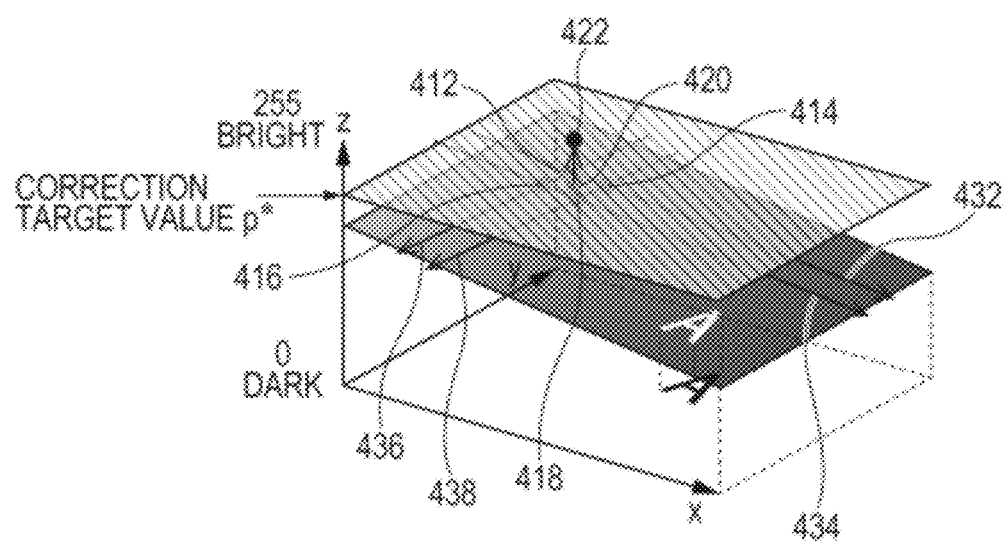
FIG. 4 illustrates an example of processing performed by an amount-of-fog estimating module, a pixel-value measuring module, and a correction-target-value determining module.

FIG. 4 illustrates an example of a process of eliminating fog from an image, which is represented three-dimensionally, such process being executed by the amount-of-fog estimating module 120, the pixel-value measuring module 130, and the correction-target-value determining module 140. In FIG. 4, the x axis and the y axis designate a position in the image, and the z axis is a space representing the luminance value. Along the z axis, the gray plane positioned at the lower side is a fog image, which covers the entire image. The gray plane is decreased in the x-axis direction because the fog image becomes darker toward the right side. The pale hatched plane positioned at the upper side designates the corrected luminance value of the image. As shown in FIG. 4, p* is the correction target value determined in step S208, and is, for example, the luminance value which is lower than the brightest luminance value by 10%, as described above. In step S210, the luminance values at the individual points are increased (luminance is brighter) to p* on the z axis, thereby eliminating fog. FIG. 4 shows that the luminance at a point of intersection 420 surrounded by points of intersection 412, 414, 416, and 418 is increased to an intermediate point 422. The points of intersection 412 and 414 are positioned on a line 432, while the points of intersection 416 and 418 are positioned on a line 434. The points of intersection 412 and 416 are positioned on a line 436, while the points of intersection

414 and 418 are positioned on a line 438. Concerning a character portion (shown as "A" in FIG. 4), which is other than the background of the image, a luminance value lower than that of the background is measured by the pixel-value measuring module 130.

In step S210, the luminance correcting module 150 corrects the luminance of the image. The luminance correcting module 150 checks the difference between the estimated luminance value and the measured luminance value. If the difference is positioned on the darker side (if the result obtained by subtracting the measured luminance value from the estimated luminance value is a positive value), the amount of correction is suppressed more than the background. That is, the luminance of, for example, character portions, is not increased more than necessary.

Figure 5B:
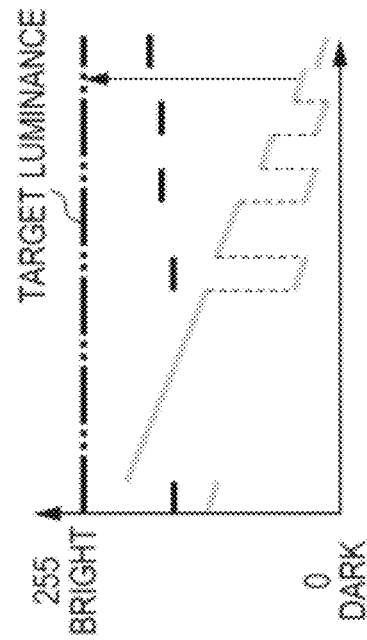
FIGS. 5A and 5B illustrate an example of processing performed by a luminance correcting module.
Figure 5A:
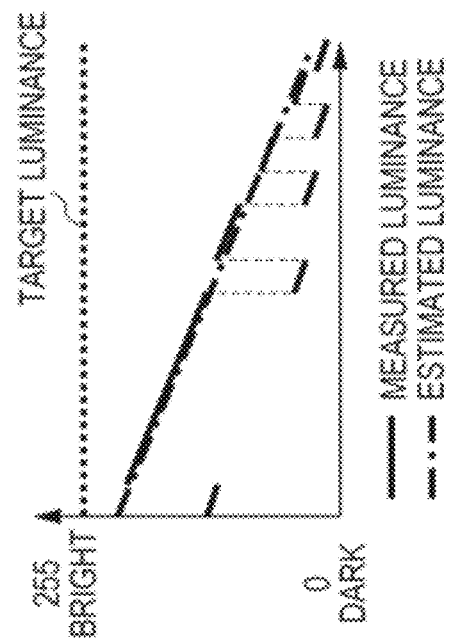

FIGS. 5A and 5B illustrate an example of processing performed by the luminance correcting module 150. FIG. 5A illustrates an example of a graph representing an image which has not yet been corrected by the luminance correcting module 150. FIG. 5B illustrates an example of a graph representing an image which has been corrected by the luminance correcting module 150. In the graphs shown in FIGS. 5A and 5B, the correction target value determined by the correction-target-value determining module 140 is indicated by the dotted line in the horizontal direction. In the graph shown in FIG. 5A, the luminance measured by the pixel-value measuring module 130 is indicated by the solid line, while the amount of fog (estimated luminance value) estimated by the amount-of-fog estimating module 120 is indicated by the one-dot chain line. In the graph shown in FIG. 5B, the luminance measured by the pixel-value measuring module 130 is indicated by the gray solid line, while the luminance value corrected by the luminance correcting module 150 is indicated by the black solid line. That is, the luminance of the background is increased to the correction target value (the luminance is elevated so that the color of the background is paler). In contrast, even though the luminance values of portions other than the background are increased, the amount of correction is smaller than that for the background. Accordingly, the portions other than the background have not become too pale.

A determination regarding whether a certain subject portion within a received image is a background portion or a portion other than a background portion can be made as follows.

If the result obtained by subtracting the measured luminance value from the estimated luminance value of a subject portion is smaller than a threshold, the subject portion is a background portion.

If the result obtained by subtracting the measured luminance value from the estimated luminance value of a subject portion is equal to or greater than the threshold, the subject portion is a portion other than a background portion.

The threshold used for this determination is a predetermined value that allows a subject portion to be recognized as a portion other than a background (e.g., a character) with human eyes.

Then, concerning portions that are found to be background portions, the amount of correction is calculated by subtracting the estimated luminance value from the correction target value. This amount of correction serves as the basic amount of correction. In contrast, concerning portions that are found to be portions other than a background portion, the amount of correction is calculated by multiplying the basic amount of correction by a correction rate R. Then, the calculated amount of correction is added to the measured luminance value. The correction rate R is 1 or smaller, and is calculated according to equation (1):

$$R = \max(0, 1 - \rho^2(\max(0, e-v))^2) \quad (1)$$

where e is an estimated luminance value, v is a measured luminance value, and ρ is a correction intensity parameter. As the difference between the measured luminance value (v) and the estimated luminance value (e) is greater, the correction rate (R), which is a coefficient, approximates to 0. If the right side of equation (1), i.e., the outer term max( ), is 0, and if the difference exceeds a predetermined value, the luminance is not corrected. That is, the correction rate (R) is 0, and the luminance is not corrected (the measured luminance value is maintained as it is). The correction intensity parameter ρ is a predetermined value.

The corrected luminance value new_v is calculated according to equation (2):

$$\begin{aligned} \text{new\_v} &= v + C \\ &= v + R(p^* - e) \\ &= v + (p^* - e)\max(0, 1 - \rho^2(\max(0, e-v))^2) \end{aligned} \quad (2)$$

where p* is a correction target value, and C is the above-described amount of correction.

The luminance correcting module 150 may utilize equation (3) instead of equation (1):

$$R = \max(0, 1 - \rho^2(\max(0, e-v))^{|p^*-e|/\tau}) \quad (3)$$

where τ is a magnification correction value.

By utilizing equation (3), if the difference (p*−e) between the correction target value and the estimated luminance value is large, the amount of correction is suppressed considerably even if the difference between the estimated luminance value and the measured luminance value is small. As the magnification correction value τ, the intermediate luminance value, which is 128, may be used.

In step S212, the output module 160 outputs an image for which the luminance has been corrected. For example, a printer prints an image from which fog has been eliminated.

Second Exemplary Embodiment

Figure 6:
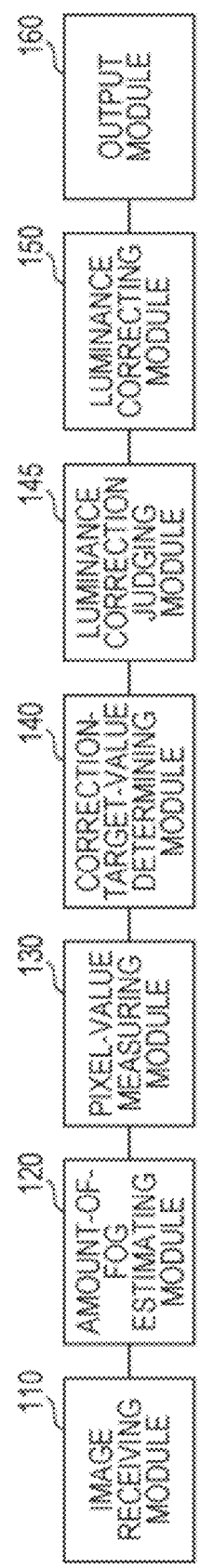
FIG. 6 is a block diagram illustrating conceptual modules forming an image processing apparatus according to a second exemplary embodiment.

FIG. 6 is a block diagram illustrating conceptual modules forming an image processing apparatus according to a second exemplary embodiment.

The image processing apparatus shown in FIG. 6 of the second exemplary embodiment serves the function to eliminate fog from images. The image processing apparatus shown in FIG. 6 includes by way of example an image receiving module 110, an amount-of-fog estimating module 120, a pixel-value measuring module 130, a correction-target-value determining module 140, a luminance correction judging module 145, a luminance correcting module 150, and an output module 160. The same or similar elements as or to those in the first exemplary embodiment are designated by like reference numerals, and an explanation thereof will be omitted (the same applies to a description of the following exemplary embodiments).

The correction-target-value determining module 140 is connected to the pixel-value measuring module 130 and the luminance correction judging module 145. The correction-target-value determining module 140 of the second exemplary embodiment is comparable to the counterpart of the first exemplary embodiment, except that it delivers a determined correction target value to the luminance correction judging module 145.

The luminance correction judging module 145 is connected to the correction-target-value determining module 140 and the luminance correcting module 150. When the gradient of the estimated luminance value is large and when the difference between the estimated luminance value and the target luminance value is also large, portions other than the background, such as characters, may sometimes become too dense to be illegible. Taking this situation into consideration, the luminance correction judging module 145 does not always perform correction processing.

The luminance correction judging module 145 judges whether to perform correction by using the luminance correcting module 150, on the basis of the difference between the amount of fog of the pixels estimated by the amount-of-fog estimating module 120 and the correction target value determined by the correction-target-value determining module 140. This determination processing will be discussed later by using equation (4).

The luminance correction judging module 145 may judge whether to perform correction by using the luminance correcting module 150 on the basis of the difference between the amounts of fog estimated by the amount-of-fog estimating module 120 within the image received by the image receiving module 110. This determination processing will be discussed later by using equations (5) and (6).

The luminance correcting module 150 is connected to the luminance correction judging module 145 and the output module 160. The luminance correcting module 150 of the second exemplary embodiment is comparable to the counterpart of the first exemplary embodiment. However, it performs correction only when the luminance correction judging module 145 judges that correction will be performed.

Figure 7:
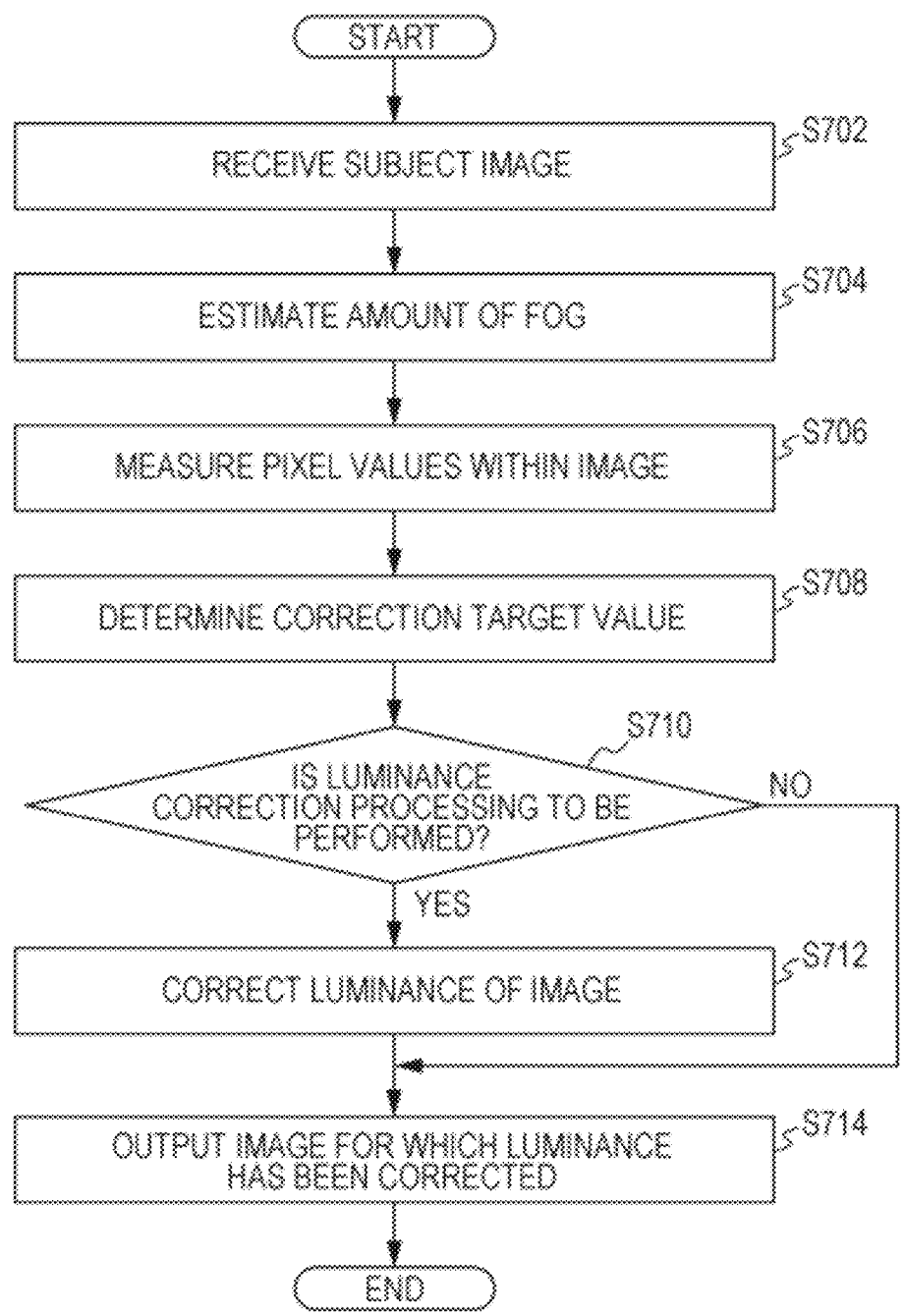
FIG. 7 is a flowchart illustrating an example of processing according to the second exemplary embodiment.

FIG. 7 is a flowchart illustrating an example of processing performed by the image processing apparatus according to the second exemplary embodiment. Steps S702 through S708, S712, and S714 are similar to steps S202 through S208, S210, and S212, respectively, shown in FIG. 2.

In step S702, the image receiving module 110 receives a subject image.

In step S704, the amount-of-fog estimating module 120 estimates an amount of fog.

In step S706, the pixel-value measuring module 130 measures pixel values within the image.

In step S708, the correction-target-value determining module 140 determines a correction target value.

In step S710, the luminance correction judging module 145 judges whether to perform luminance correction processing. If the result of step S710 is YES, the process proceeds to step S712, and if the result of step S710 is NO, the process proceeds to step S714.

For example, if the calculated value E in one of equations (4), (5), and (6) exceeds a predetermined value, luminance correction processing is not performed.

$$E = \max_{i,j}(|p^*_{ij} - e_{ij}|) \tag{4}$$

In equation (4), $e_{ij}$ is an estimated luminance value at coordinates $(x_i, y_j)$, and $p^*_{ij}$ is a correction target value at coordinates $(x_i, y_j)$.

In equation (4), the difference between the estimated luminance value and the correction target value is utilized. In the example shown in FIG. 5A, the maximum value between the dotted line and the one-dot chain line designates the calculated value E.

$$E'_1 = \max_{i,j,m,n}(|e_{ij} - e_{mn}|) \tag{5}$$

In equation (5), the difference between estimated luminance values of the pixels is utilized. In the example shown in FIG. 5A, the distance between the maximum value and the minimum value of the one-dot chain line designates the calculated $E'_1$.

$$E'_2 = \max_{i,j,m,n}\left(|e_{ij} - e_{mn}|/\sqrt{(x_i - x_m)^2 + (y_j - y_n)^2}\right) \tag{6}$$

In equation (6), the difference between estimated luminance values of the pixels is normalized by the distance and is utilized as the gradient. In the example shown in FIG. 5A, the gradient of the one-dot chain line designates the calculated $E'_2$.

In step S712, the luminance correcting module 150 corrects the luminance of the image.

In step S714, the output module 160 outputs the image for which the luminance has been corrected.

In comparison with the first and second exemplary embodiments, a comparative example will be described below with reference to FIGS. 23C through 23F.

Even if the amount of fog is correctly calculated, the following problem arises in the comparative example. Since the luminance of a character portion is around 0 (black), the difference between a background portion and the character portion is only small. Then, if the luminance value of the character portion is increased by the same amount as that for the background portion, the character portion becomes too bright.

This will be described below with reference to FIGS. 23C through 23F. Within the photographed image 2330 shown in FIG. 23C, a line 2332 is scanned, and the luminance values obtained as a result of scanning are represented by a graph shown in FIG. 23D. That is, since the fog image 2320 is darker toward the right side, the luminance value decreases toward the right side accordingly. However, the luminance values of the original image are also reflected in the pixel values shown in FIG. 23D, and thus, the luminance values are progressively changed, as indicated by luminance distributions 2342 through 2358. Then, if the luminance values of background portions (luminance distributions 2344, 2348, 2352, and 2356) are corrected toward the target value, portions other than the background portions (luminance distributions 2346, 2350, and 2354) are also corrected as indicated by the solid lines (2374 through 2380) in FIG. 23F. Then, the resulting image is seen as a corrected image 2360 shown in FIG. 23E. In the right side of the corrected image 2360, the black characters have turned out to be a pale gray. This is because correction is equally performed on portions other than background portions, as well as on the background portions.

In contrast, in the first and second exemplary embodiments, as indicated by the dotted lines representing correction luminance distributions 2382 through 2388, shown in FIG. 23F, a smaller amount of correction is performed on portions other than background portions; thereby maintaining a high level of reproducibility.

Third Exemplary Embodiment

A description will now be given of third and fourth exemplary embodiments.

In order to facilitate the understanding of the third and fourth exemplary embodiments, a technology, which serves as a basis for the third and fourth exemplary embodiments, will first be described.

Figure 24E:
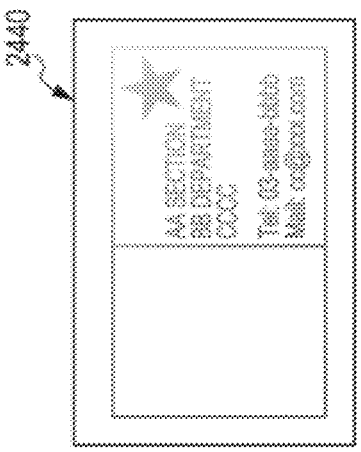
Figure 24C:
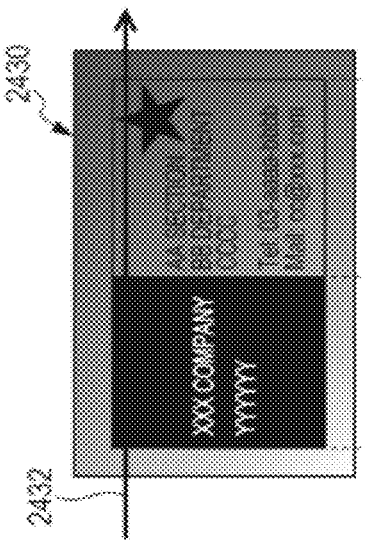
Figure 24A:
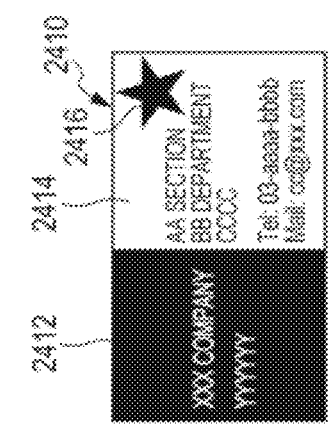
Figure 24F:
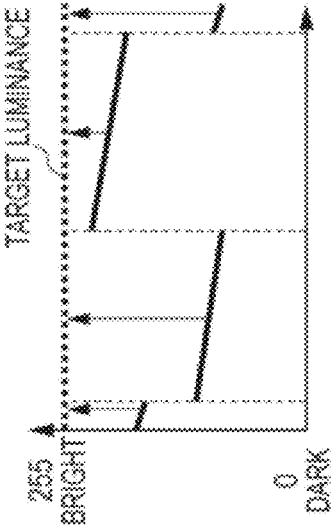
Figure 24D:
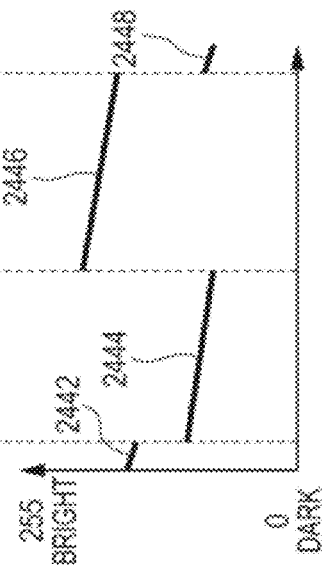
Figure 24B:
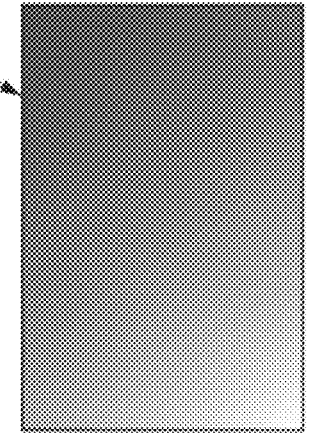

In FIG. 24A, a subject document 2410 to be photographed is a name card and contains, not only a black and white portion, but also a chromatic color portion. More specifically, within the subject document 2410, the background of a region 2412 is red, the background of a region 2414 is white, and a graphic 2416 is a red mark. The subject document 2410 is photographed by using, for example, a digital camera, resulting in a photographed image 2430 shown in FIG. 24C. The photographed image 2430 shows that image deterioration, such as a fog image 2420 shown in FIG. 24B, has occurred and is superposed on the photographed image 2430. The reasons why the fog image 2420 is generated have been described above. FIG. 24B shows that the fog image 2420 is a gradation image in which the top right is a dark black and the bottom left is white, i.e., the shade of the color progressively changes. Accordingly, in the photographed image 2430 shown in FIG. 24C, although the top right is a dark black, the bottom left is close to the image of the original subject document 2410.

As described above, fog images may be generated, not only by the use of a digital camera, but also by the use of a scanner.

Figure 8:
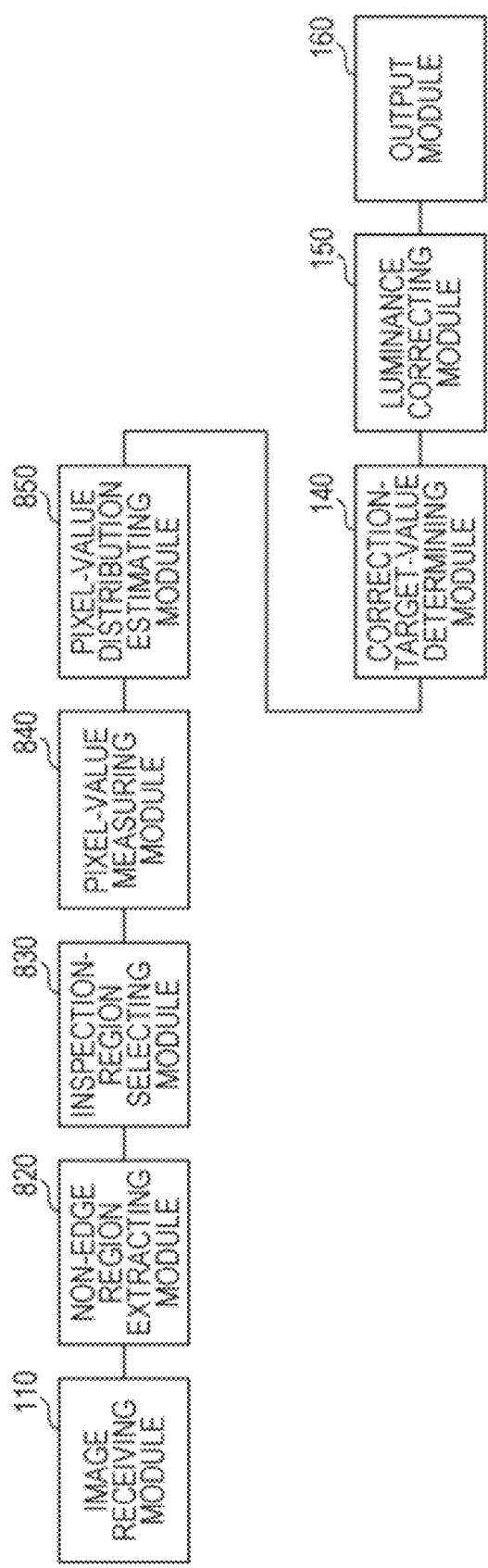
FIG. 8 is a block diagram illustrating conceptual modules forming an image processing apparatus according to a third exemplary embodiment.

FIG. 8 is a block diagram illustrating conceptual modules forming an image processing apparatus according to the third exemplary embodiment.

The image processing apparatus shown in FIG. 8 of the third exemplary embodiment serves the function to eliminate fog from images. The image processing apparatus shown in FIG. 8 includes by way of example an image receiving module 110, a non-edge region extracting module 820, an inspection-region selecting module 830, a pixel-value measuring module 840, a pixel-value distribution estimating module 850, a correction-target-value determining module 140, a luminance correcting module 150, and an output module 160.

The image receiving module 110 is connected to the non-edge region extracting module 820. The image receiving module 110 receives an image and delivers the received image to the non-edge region extracting module 820. An example of processing performed by the image receiving module 110 will be discussed later with reference to FIG. 10.

The non-edge region extracting module 820 is connected to the image receiving module 110 and the inspection-region selecting module 830. The non-edge region extracting module 820 extracts regions from an image received by the image receiving module 110 and delivers the extracted regions to the inspection-region selecting module 830.

The non-edge region extracting module 820 also extracts regions equal to or larger than a predetermined size or regions larger than the predetermined size, and if the non-edge region extracting module 820 has not found such regions, operations of the inspection-region selecting module 830, the pixel-value measuring module 840, the pixel-value distribution estimating module 850, the correction-target-value determining module 140, the luminance correcting module 150, and the output module 160 may not be performed. In this case, the non-edge region extracting module 820 may output information indicating that the above-described regions have not been found (i.e., elimination of fog has not been performed).

The regions to be extracted are regions in which color values are changed smoothly and continuously, in other words, edgeless regions or regions surrounded by edges.

An example of processing performed by the non-edge region extracting module 820 will be discussed later with reference to FIGS. 11 and 12.

The inspection-region selecting module 830 is connected to the non-edge region extracting module 820 and the pixel-value measuring module 840. The inspection-region selecting module 830 selects a region from the regions extracted by the non-edge region extracting module 820 in accordance with a predetermined rule, and delivers the selected region to the pixel-value measuring module 840.

The predetermined rule employed in the inspection-region selecting module 830 may be determined by using the sizes of the regions or the luminance or chroma values of the regions extracted by the non-edge region extracting module 820. Alternatively, the predetermined rule may be determined by at least one of the variance of the chroma values of the pixels in the extracted regions, the positions of the regions in the image, and the sizes of the outer peripheries of the regions.

An example of processing performed by the inspection-region selecting module 830 will be discussed later with reference to FIG. 13.

The pixel-value measuring module 840 is connected to the inspection-region selecting module 830 and the pixel-value distribution estimating module 850. The pixel-value measuring module 840 measures the luminance values of the pixels in the region selected by the inspection-region selecting module 830, and delivers the measurement result to the pixel-value distribution estimating module 850. The luminance values of the pixels are measured by scanning the region in a predetermined direction.

The scanning direction in which the region is scanned for measuring the luminance values of the pixels may be at least one of a horizontal direction, a vertical direction, an oblique direction, a direction in which the region is scanned in an elliptical shape. The scanning direction may be two directions, such as a combination of the horizontal direction and the vertical direction, a top right oblique direction and a bottom right oblique direction, or may be one direction, such as scanning the region in an elliptical shape, or may be a combination of three scanning directions.

An example of processing performed by the pixel-value measuring module 840 will be discussed later with reference to FIGS. 14A through 15B.

The pixel-value distribution estimating module 850 is connected to the pixel-value measuring module 840 and the correction-target-value determining module 140. The pixel-value distribution estimating module 850 estimates a function representing the degree of fog in the image received by the image receiving module 110 from the pixel values measured by the pixel-value measuring module 840, and delivers the estimated function to the luminance correcting module 150. The function representing the degree of fog may be a linear function or a multidimensional function, such as a quadratic function.

The pixel-value distribution estimating module 850 may estimate a function generated by connecting the luminance values of the pixels in the region selected by the inspection-region selecting module 830.

An example of processing performed by the pixel-value distribution estimating module 850 will be discussed later with reference to FIGS. 16A through 17C.

The correction-target-value determining module 140 is connected to the pixel-value distribution estimating module 850 and the luminance correcting module 150. The correction-target-value determining module 140 determines a correction target value for the luminance values of pixels in background portions within the image received by the image receiving module 110 and delivers the determined correction target value to the luminance correcting module 150.

The luminance correcting module 150 is connected to the correction-target-value determining module 140 and the output module 160. The luminance correcting module 150 eliminates fog from the image received by the image receiving module 110 on the basis of the function estimated by the pixel-value distribution estimating module 850, and delivers the image from which fog has been eliminated to the output module 160. That is, the luminance correcting module 150 calculates the amount of fog on the basis of the function estimated by the pixel-value distribution estimating module 850, and corrects the luminance value measured by the pixel-value measuring module 840 on the basis of the calculated amount of fog and the correction target value determined by the correction-target-value determining module 140.

If the pixel-value measuring module 840 has measured the luminance values of the pixels by scanning the region of the image in plural scanning directions, the luminance correcting module 150 may calculate the value of fog at a position at which the scanning directions intersect with each other, on the basis of the values obtained from plural functions estimated by the pixel-value distribution estimating module 850. Concerning pixels which are not positioned on the scanning lines, the values of fog at the positions of such pixels may be calculated by using the values of fog at the positions of the pixels on the scanning lines in accordance with the distances between the pixels on the scanning lines and the corresponding pixels which are not on the scanning lines. The values of fog indicate the differences between the pixel values of the received image and the pixel values of the original image (pixel values of an image which has been photographed without the occurrence of fog).

An example of processing performed by the luminance correcting module 150 will be discussed later with reference to FIGS. 18 through 20.

The output module 160 is connected to the luminance correcting module 150. The output module 160 receives an image from which fog has been eliminated by the luminance correcting module 150 and outputs the image.

Figure 9:
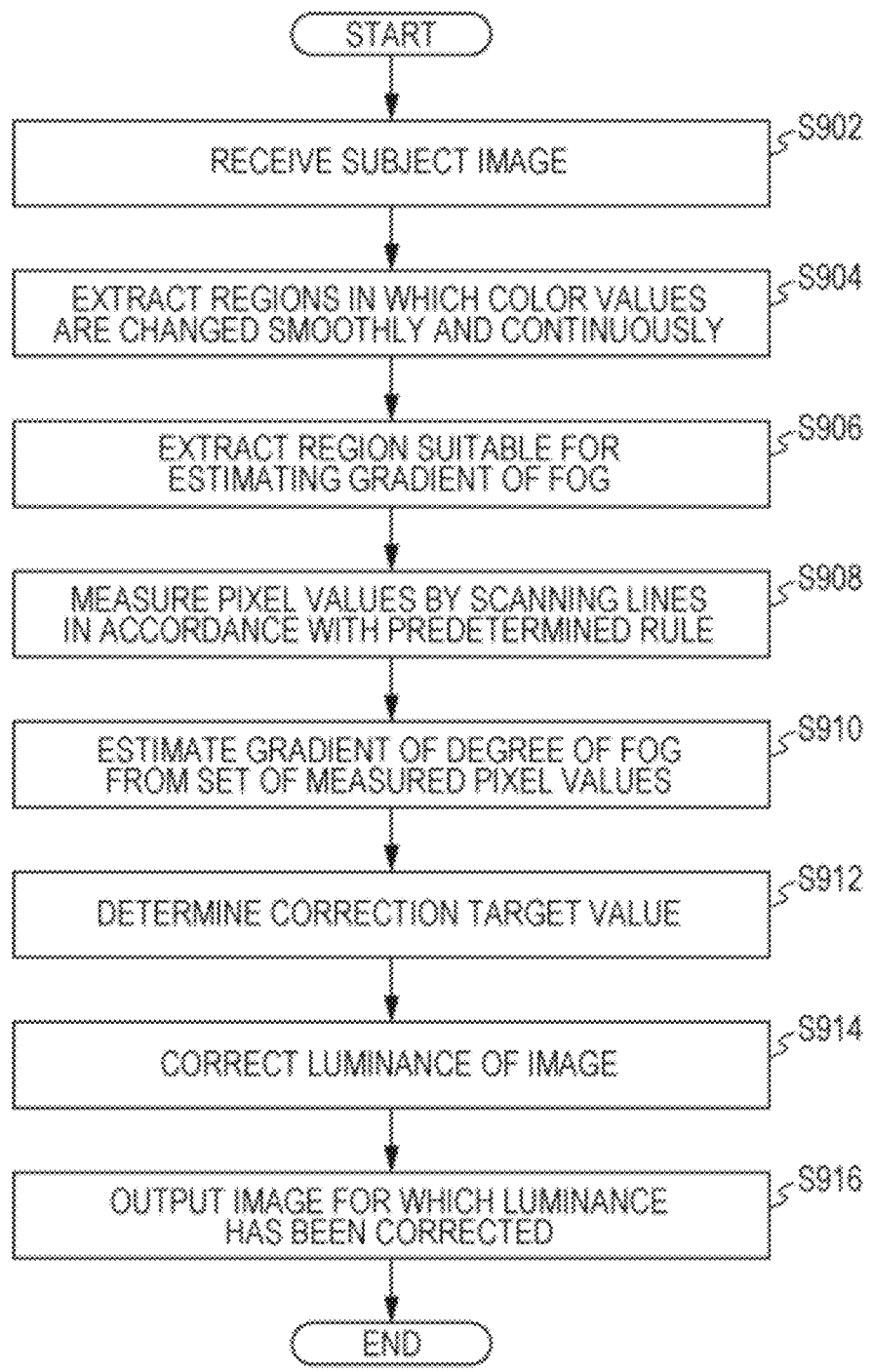
FIG. 9 is a flowchart illustrating an example of processing according to the third exemplary embodiment.

FIG. 9 is a flowchart illustrating an example of processing according to the third exemplary embodiment.

In step S902, the image receiving module 110 receives a subject image.

Figure 10:
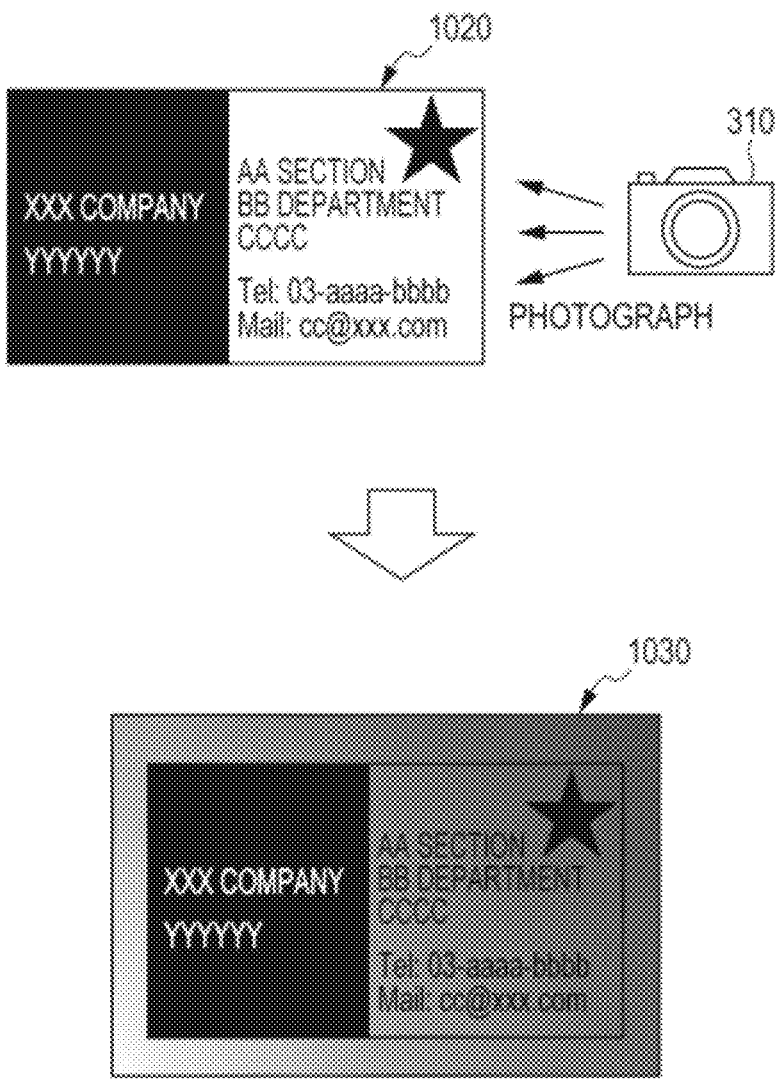
FIG. 10 illustrates an example of processing performed by an image receiving module.

FIG. 10 illustrates an example of processing performed by the image receiving module 110. A subject document 1020 to be photographed is equivalent to the subject document 2410 shown in FIG. 24A. The subject document 1020 includes a region having a red background at the left side, a region having a white background at the right side, and a region representing a red mark at the top right. When the subject image 1020 is photographed by using an image capturing device 310, fog occurs and is reflected in a resulting image, such as that in a photographed image 1030. For example, after exchanging name cards, the subject document 1020 representing one of the name cards is placed on a desk and is photographed with the image capturing device 310. The image capturing device 310 may be an independent digital camera, a digital camera built in a personal digital assistant e.g., in a cellular phone including a smartphone, or a scanner, etc.

In step S904, the non-edge region extracting module 820 extracts regions in which color values are changed smoothly and continuously.

Figure 11:
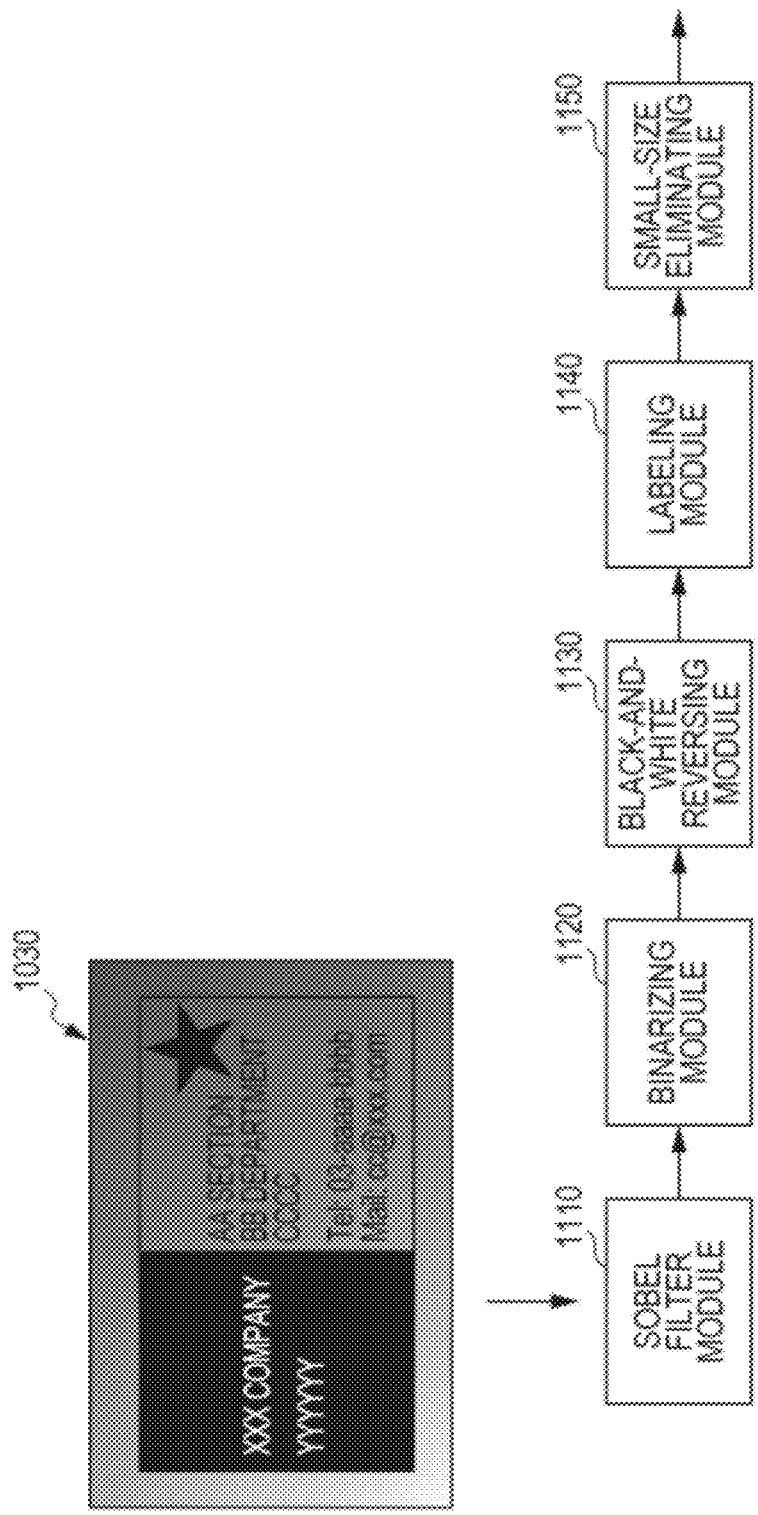
FIGS. 11 and 12 illustrate an example of processing performed by a non-edge region extracting module.
Figure 12:
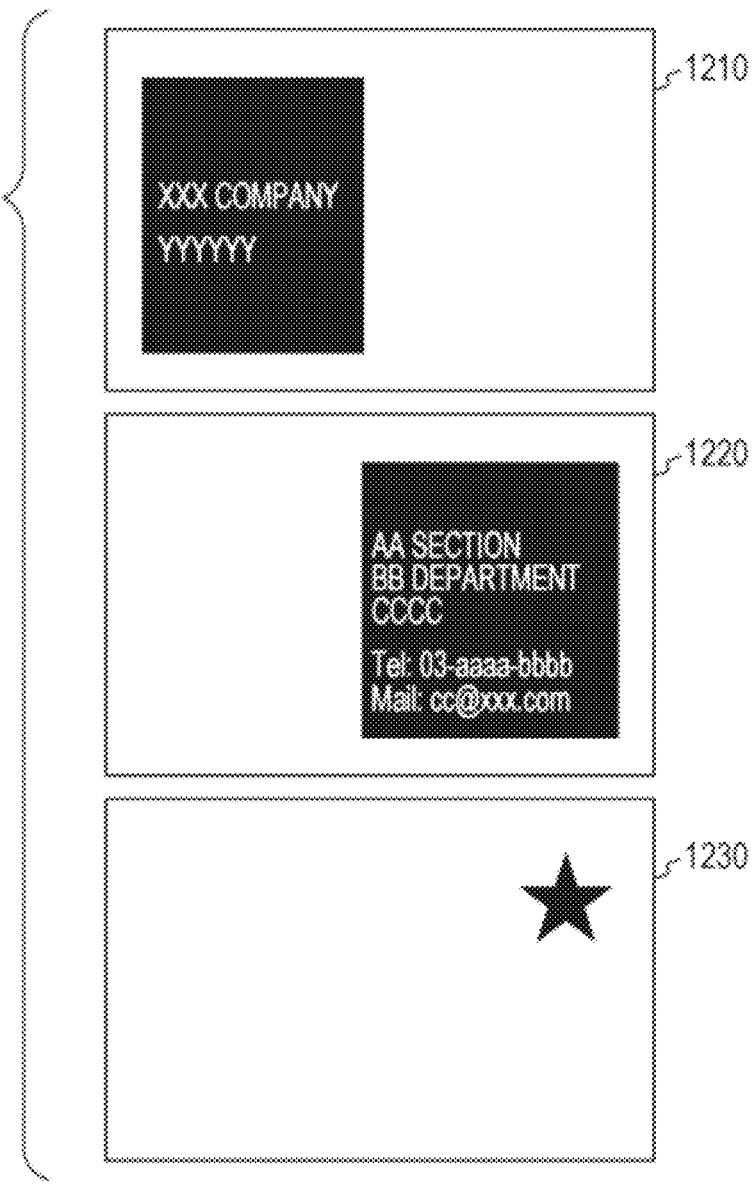

FIGS. 11 and 12 illustrate an example of processing performed by the non-edge region extracting module 820. The non-edge region extracting module 820 includes, for example, a sobel filter module 1110, a binarizing module 1120, a black-and-white reversing module 1130, a labeling module 1140, and a small-size eliminating module 1150.

The sobel filter module 1110 is connected to the binarizing module 1120, and performs sobel filter processing on the photographed image 1030 received in step S902 and delivers the resulting image to the binarizing module 1120. The sobel filter processing is to detect edges of vertical lines or horizontal lines by using a filter. In the sobel filter processing, lines other than vertical lines and horizontal lines may be detected depending on the design of the filter.

The binarizing module 1120 is connected to the sobel filter module 1110 and the black-and-white reversing module 1130. Upon receiving an image in which edges have been detected by the sobel filter module 1110, the binarizing module 1120 performs binarizing processing on the image and delivers the binarized image to the black-and-white reversing module 1130. As this binarizing processing, a known binarizing processing technique may be applied. As a result of this binarizing processing, the edges have turned out to be black and the other portions have turned out to be white.

The black-and-white reversing module 1130 is connected to the binarizing module 1120 and the labeling module 1140. Upon receiving the binarized image from the binarizing module 1120, the black-and-white reversing module 1130 performs black-and-white reverse processing on the binarized image and delivers the resulting image to the labeling module 1140. As a result of this black-and-white reverse processing, the edges are changed to white, and the other portions are changed to black.

The labeling module 1140 is connected to the black-and-white reversing module 1130 and the small-size eliminating module 1150. Upon receiving an image subjected to black-and-white reverse processing by the black-and-white reversing module 1130, the labeling module 1140 performs labeling processing on the image and delivers the resulting image to the small-size eliminating module 1150. As a result of this labeling processing, the same label is attached to a black region that exhibits continuous black pixels. Accordingly, by extracting the regions attached with the same label, regions without an edge can be extracted.

The small-size eliminating module 1150 is connected to the labeling module 1140. Upon receiving an image labeled by using the labeling module 1140, the small-size eliminating module 1150 eliminates noise, which corresponds to regions equal to or smaller than a predetermined size or regions smaller than the predetermined size. In other words, as a result of this processing, regions equal to or greater than the predetermined size or regions greater than the predetermined size can be extracted. The area of a region attached with the same label may be determined by counting the number of pixels attached with the same label or by calculating the area of a circumscribed rectangle of that region.

An example of the image obtained by performing the above-described processing on the photographed image 1030 shown in FIG. 11 is shown in FIG. 12. A region image 1210 is a region having a red background at the left side of the photographed image 1030. A region image 1220 is a region having a white background at the right side of the photographed image 1030. A region image 1230 is a region having a red mark at the top right of the photographed image 1030. However, those images are binary images, and serve as mask images. More specifically, a logical AND operation between the photographed image 1030 and the mask images is performed, thereby making it possible to extract the regions corresponding to the mask images from the photographed image 1030.

The non-edge region extracting module 820 may extract non-edge regions by performing processing other than the processing using the module configuration shown in FIG. 11. For example, the non-edge region extracting module 820 may extract non-edge regions by integrating the same color pixels. The same color pixels are not restricted to exactly the same color pixels, but may be color pixels having a predetermined relationship. More specifically, a certain pixel may be selected from an image, and pixels which are in contact with the selected pixel and which have a predetermined relationship with the selected pixel (e.g., the distance between the two pixels is equal to or smaller than a predetermined value or the distance between the two pixels is smaller than the predetermined value in a color space) may be integrated. Then, the above-described integration processing may be similarly performed on the integrated pixel. As a result, a non-edge region is extracted.

Referring back to the flowchart of FIG. 9, in step S906, the inspection-region selecting module 830 extracts a region suitable for estimating the gradient of fog.

The inspection-region selecting module 830 extracts the characteristic values of the regions extracted in step S904. Then, the inspection-region selecting module 830 calculates the value according to equation (7) (discriminant function) for each region, and selects a region (in this example, the above-described mask image) in accordance with the calculated values. For example, among the regions extracted in step S904, the region having the maximum value is selected.

$$f(X_i; w) = \sum_j w_j x_{ij} \qquad (7)$$

In equation (7), $w_j$ in the right side is a weight, and may be a positive number, 0, or a negative number. If $w_j$ is 0, it means that the corresponding characteristic value (weight) is not used. If $w_j$ is a negative number, the characteristic value acts in the negative direction. The weight $w_j$ is a predetermined value which may be set by an operator or which may be a value obtained by conducting learning by using supervisor data in which a correct answer is determined among several choices.

In equation (7), $x_{ij}$ in the right side denotes characteristic values. The inspection-region selecting module 830 extracts those characteristic values from each region (i). The characteristic values $x_{ij}$ include:

$x_{i0}$ is the width or the height of a region, or may be a width×height (i.e., the area of a circumscribed rectangle);

$x_{i1}$ is the area of a region;

$x_{i2}$ is the pixel density of a region;

$x_{i3}$ is the average of the luminance values (e.g., the value of L* in the case of an L*ab color space) of the pixels within a region;

$x_{i4}$ is the average of the chroma values (e.g., the values of a and b in the case of an L*ab color space) of the pixels within a region;

$x_{i5}$ is the variance of the chroma values of the pixels within a region;

$x_{i6}$ is the distance from the center of gravity of a region (mask image) to the center of the image received in step S902; and $x_{i7}$ is the length of the peripheral contour of a region/the boundary length of a circumscribed rectangle of the region.

The above-described characteristic values are merely examples, and other characteristic values may be used. Additionally, as one of the characteristic values, the average of the luminance or chroma values is used for describing the typical luminance or chroma of the pixels in a region. However, instead of using the average, a value representing the typical luminance or chroma of a region may be used, for example, a modal value or a median value may be used.

It is not necessary to use all the characteristic values, and some of them may be selected. For example, a discriminant function using one of the characteristic values $x_{i0}$, $x_{i1}$, and $x_{i2}$ may be employed. This is because a large area is suitable for estimating a function representing the degree of fog.

Further, $x_{i3}$ or $x_{i4}$ may be added in order to select a background region of the document. This is because a background region is also suitable for estimating a function indicating the degree of fog. The background region is generally white, and thus, it has a high luminance value and a low chroma value. The weight $w_4$ of the chroma value $x_{i4}$ is a negative value.

The above-described characteristic values are sufficient to estimate the degree of fog superposed on images, such as name cards, documents, and whiteboards having a white background. However, such characteristic values may not be sufficient for images obtained by photographing a document, such as a name card, in which a landscape picture occupies the half of the area of the document (the area of the white background is relatively narrow), or for images obtained by photographing a whiteboard facing toward the light (the surrounding portion of the photographed image has a high luminance value).

Accordingly, $x_{i5}$ through $x_{i7}$ may be added.

Generally, the variance of chroma values of a landscape picture is higher than that of a background. Thus, $x_{i5}$ may be used so that a region having a smaller variance of chroma values can be selected while preventing a landscape picture from being selected. The weight $w_5$ of the variance of the chroma values $x_{i5}$ is a negative value.

Generally, when photographing an image, a user intentionally places a target region at the center of the image. Accordingly, $x_{i6}$ may be used so that a region of which the center of gravity (or the center) is placed around the center of the image can be selected. The weight $w_6$ of the distance $x_{i6}$ is a negative value.

The outer periphery of a region of a landscape picture contains more uneven portions than that of a circumscribed rectangle. In contrast, the background of, for example, a name card, is a rectangle, and, in most cases, the outer periphery of the rectangle is linear. Accordingly, $x_{i7}$ may be used so that a region having a short peripheral contour can be selected while preventing a landscape picture from being selected. The weight $w_7$ of the peripheral contour $x_{i7}$ is a negative value.

FIG. 13 illustrates an example of processing performed by the inspection-region selecting module 830. The calculation result of the discriminant function for the region image 1210 is 1.5, as expressed by equation (8).

$$f(X_1; w) = \sum_j w_j x_{1j} \qquad (8)$$
$$= 1.5$$

The calculation result of the discriminant function for the region image 1220 is 2.0, as expressed by equation (9).

$$f(X_2; w) = \sum_j w_j x_{2j} \qquad (9)$$
$$= 2.0$$

The calculation result of the discriminant function for the region image 1230 is 0.2, as expressed by equation (10).

$$f(X_3; w) = \sum_j w_j x_{3j} = 0.2 \quad (10)$$

Then, the maximum of the calculated values of the discriminant functions, as expressed by equation (11), is selected.

$$X^* = \operatorname*{argmax}_i f(X_i; w) \quad (11)$$

In this case, the region corresponding to the region image 1220 is selected, as expressed by equation (12).

$$X^* = X_2 \quad (12)$$

In step S908, the pixel-value measuring module 840 scans the lines of the region in accordance with a predetermined rule so as to measure the pixel values in the region.

FIGS. 14A through 15B illustrate an example of processing performed by the pixel-value measuring module 840.

An extracted region image 1400 is an image obtained by performing a logical AND operation between the image 1030 received in step S902 and the region image 1220 selected in step S906. That is, the region having a white background at the right side of the photographed image 1030 is extracted. Scanning is performed on the extracted region image 1400 in the vertical and horizontal directions at predetermined intervals (e.g., at equal intervals). For example, lines 1402 through 1418 are scanned in the horizontal direction and lines 1422 through 1442 are scanned in the vertical direction. Then, a graph is plotted by connecting the luminance values of the pixels. An example of a graph representing the luminance values of pixels obtained by scanning the line 1402 is shown in FIG. 14B. Since the line 1402 is not contained in the selected region, the graph is constituted of only invalid data. An example of the graph obtained by scanning the line 1412 is shown in FIG. 14C. Since part of the line 1412 is contained in the selected region, the graph is constituted of valid data and invalid data. In the graph shown in FIG. 14C, the luminance value decreases toward the right side. This is because the fog image becomes darker, on the whole, toward the upper right side.

A determination regarding whether the graph contains valid data or invalid data can be made by scanning the region image (mask image, i.e., the region image 1220 shown in FIG. 13) selected by the inspection-region selecting module 830. Positions within the black portion in the region image 1220 correspond to positions containing valid data in the extracted region image 1400, while positions within the white portion in the region image 1220 correspond to positions containing invalid data in the extracted region image 1400. In the graphs of this example, the luminance value of the invalid data is 0.

Figure 14A:
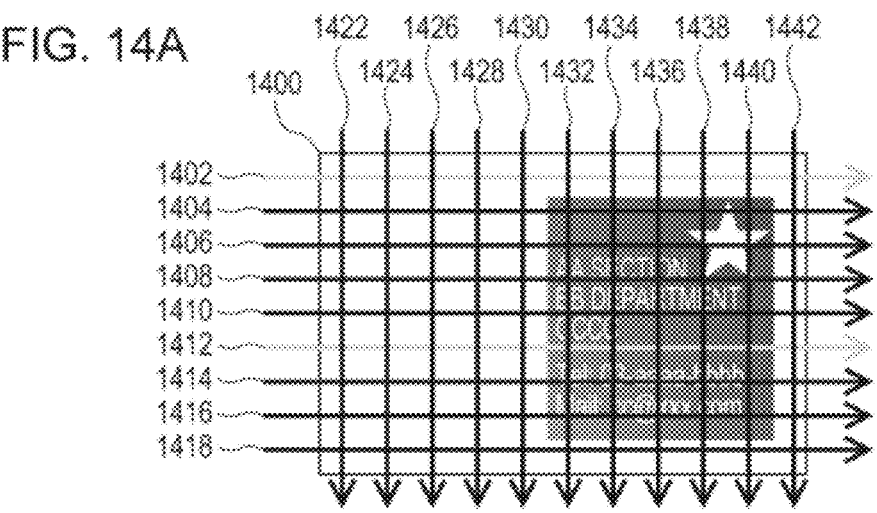
FIGS. 14A through 15B illustrate an example of processing performed by a pixel-value measuring module.
Figure 14B:
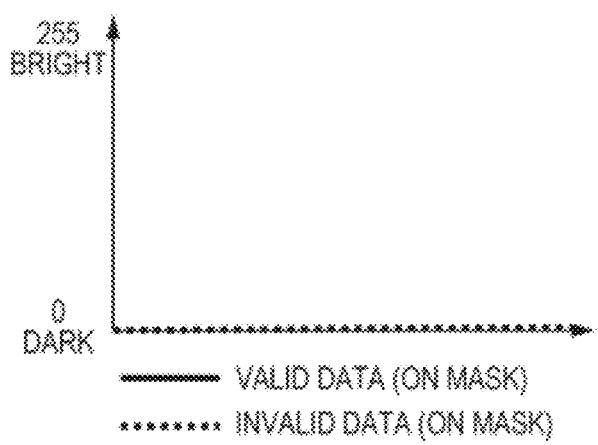
Figure 14C:
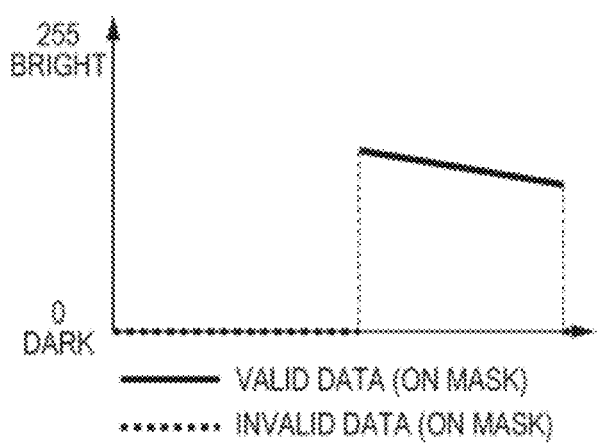
Figure 15A:
Figure 15B:
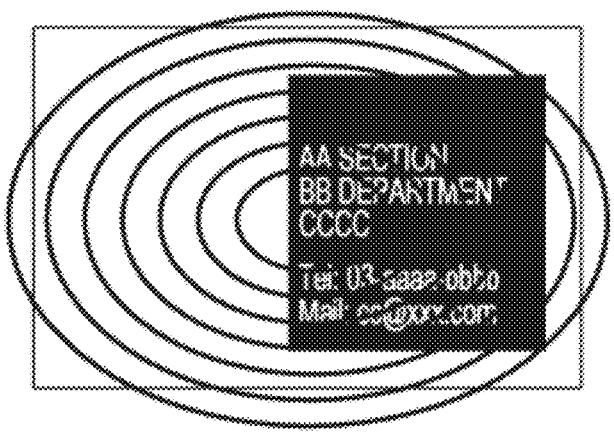

As the predetermined rule employed when scanning the extracted region image 1400, not only the vertical and horizontal scanning shown in FIG. 14A, but also scanning shown in FIG. 15A may be performed. More specifically, in the scanning shown in FIG. 15A, scanning may be performed at predetermined intervals in an oblique direction from the top left side to the bottom right side and an oblique direction from the top right side to the bottom left side. Alternatively, scanning may be performed, as shown in FIG. 15B, in an elliptical shape at predetermined intervals. In this case, examples of the elliptical shape may include a circle. The scanning direction may be selected by an operator in accordance with the gradient of the luminance values of fog, or may be determined in advance in accordance with an image capturing device.

In step S910, the pixel-value distribution estimating module 850 estimates the gradient of degree of fog (function representing the degree of fog) from a set of the measured pixel values. As the function representing the degree of fog estimated in this example, a linear function is used by way of example.

FIGS. 16A through 17C illustrate an example of processing performed by the pixel-value distribution estimating module 850.

Figures 16A, 16B, 16C:
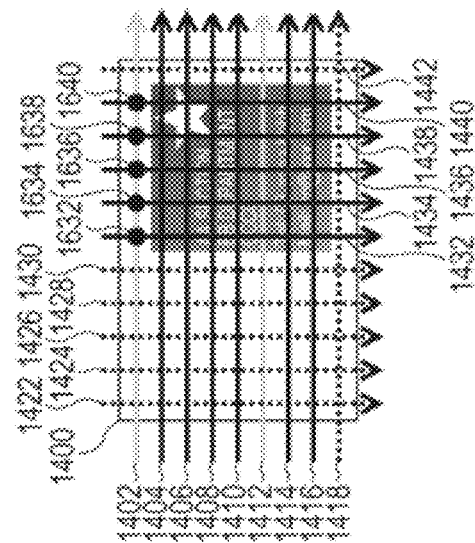

As shown in the example of FIG. 16A, the function representing the degree of fog in the vertical scanning is represented by equation (13), and the function representing the degree of fog in the horizontal direction is represented by equation (14).

$$c_j(y; \gamma_j, \delta_j) = \gamma_j + \delta_j x \quad (13)$$

$$r_i(x; \alpha_i, \beta_i) = \alpha_i + \beta_i x \quad (14)$$

In the example shown in FIG. 16B, lines including valid data are indicated by the solid lines, while lines including only invalid data are indicated by the dotted lines. The lines including valid data are the lines 1404 through 1416 and the lines 1432 through 1440. The lines including only invalid data are the lines 1402 and 1418 and the lines 1422 through 1430 and 1442.

Figure 17A:
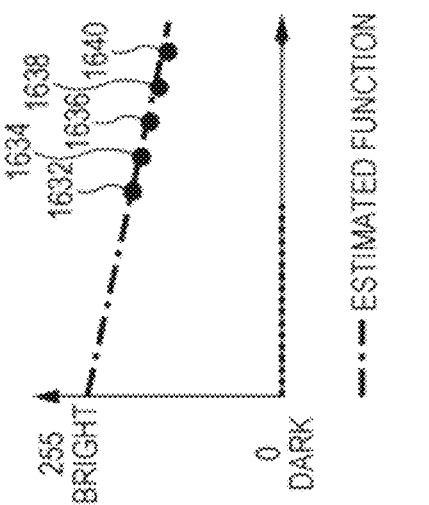
Figure 17B:
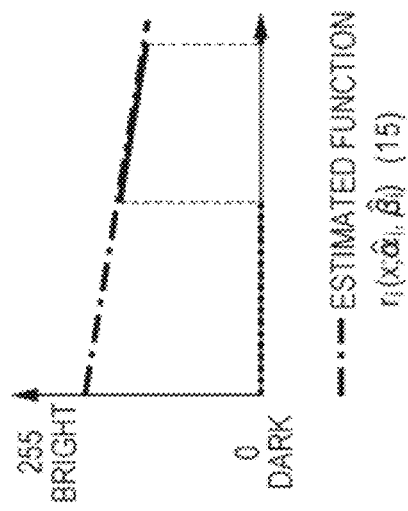

FIG. 17A illustrates a graph representing a line including valid data. Each of the lines 1404 through 1416 can be represented by a graph similar to the graph shown in FIG. 17A. A function represented by each of the graphs of the luminance values is estimated by using the least squares method, etc. For example, the function represented by a graph of the luminance values obtained by scanning the horizontal lines can be expressed by equation (15). In each of the lines, if the number of valid data elements is smaller than a predetermined number, the function is estimated without using those valid data elements. In the example shown in FIG. 17B, equation (15) is represented by the one-dot chain line.

$$r_i(x; \hat{\alpha}_i, \hat{\beta}_i) \quad (15)$$

Figure 17C:
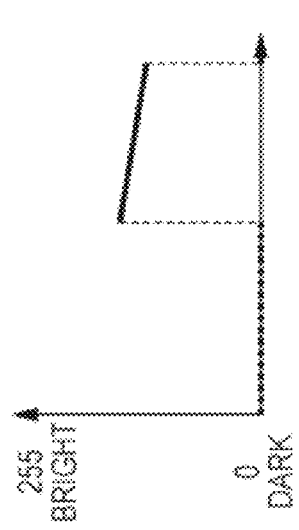

The function is also applicable to the lines without valid data. Accordingly, in order to determine luminance values at estimation points 1632 through 1640 on the line 1402 without valid data, as shown in FIG. 16C, the function is applied, as shown in FIG. 17C, to determine the luminance values at the estimation points 1632 through 1640. This means that the estimated function applies to the entire image.

Estimation of the function using vertical lines is performed similarly to estimation of the function using horizontal lines.

In step S912, the correction-target-value determining module 140 determines a correction target value, as in the counterparts of the first and second exemplary embodiments. The correction target value may be determined differently from the above-described technique. For example, the luminance values of the pixels at plural points of intersection (e.g., points of intersection within the region selected by the inspection-region selecting module 830) are collected so as to generate a luminance histogram. Then, in the luminance histogram, the luminance value at a predetermined point of intersection (e.g., a point of intersection having a luminance value lower than the brightest luminance by 10%) may be set.

In step S914, the luminance correcting module 150 corrects the luminance of the image. That is, the luminance correcting module 150 calculates the amount of fog to be eliminated by using the gradient of degree of fog (function estimated in step S910), thereby correcting the pixel value of the image at each set of coordinates of the graph. As a result of the correction performed in step S914, fog is eliminated from the photographed image so as to reconstruct the original image.

Figure 18:
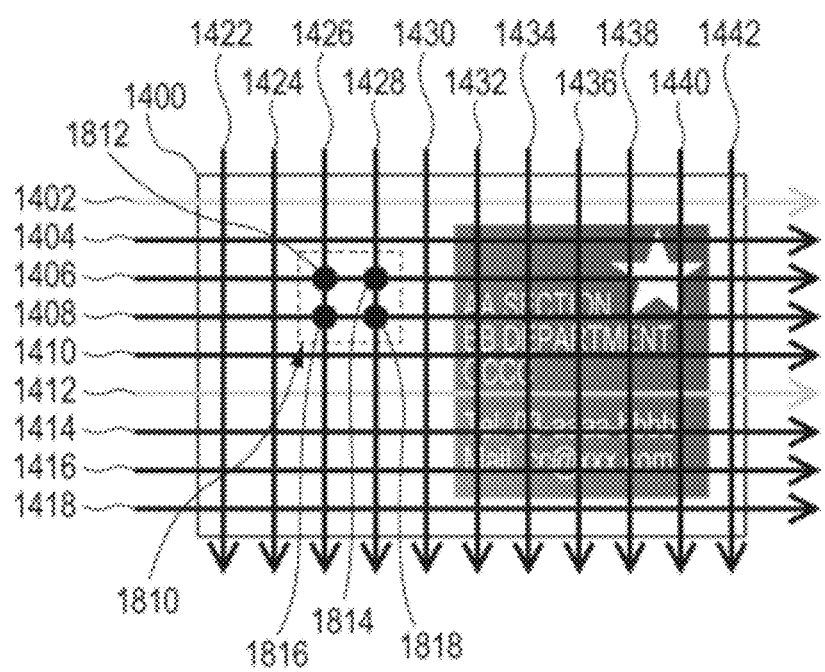
FIGS. 18 through 20 illustrate an example of processing performed by a luminance correcting module.
Figure 19:
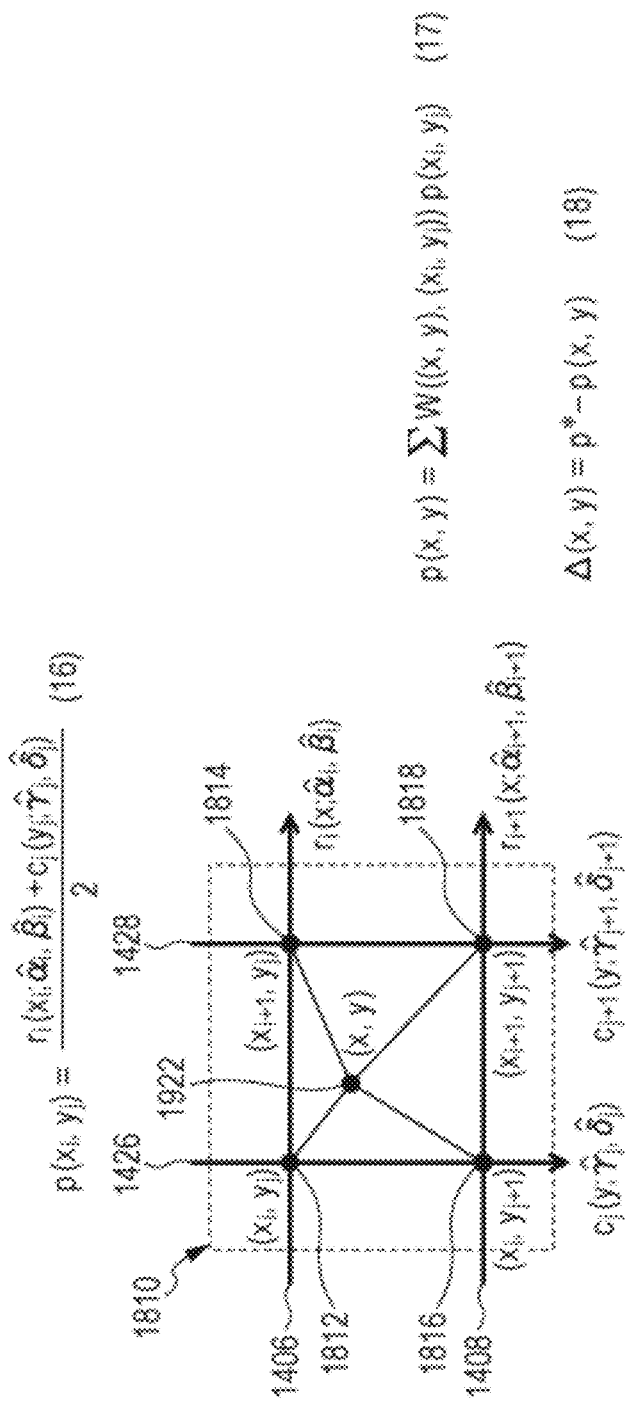
Figure 20:
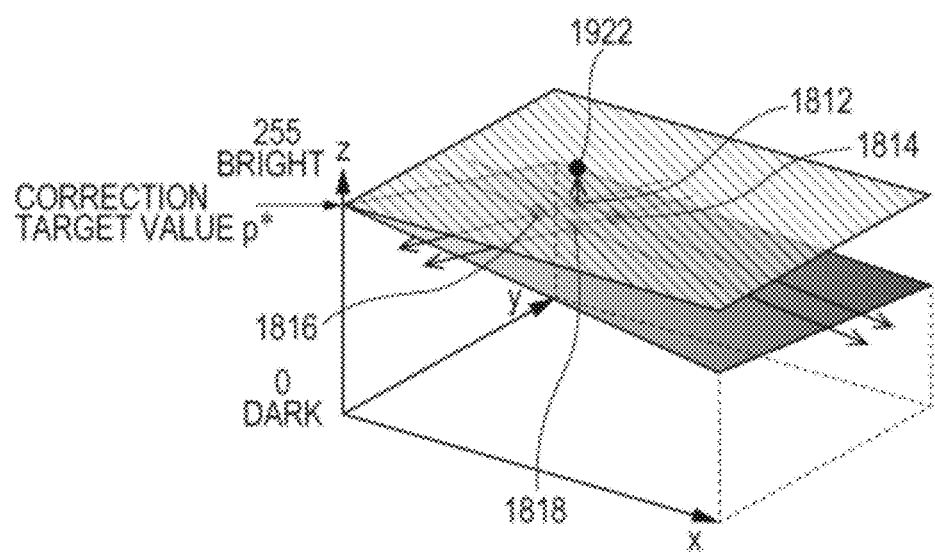

FIGS. 18 through 20 illustrate an example of processing performed by the luminance correcting module 150.

Calculation of the amounts of fog at four points of intersection 1812, 1814, 1816, and 1818 within a region 1810 shown in FIG. 18 will be described below with reference to FIG. 19. The point of intersection 1812 is the intersection between the lines 1406 and 1426. The point of intersection 1814 is the intersection between the lines 1406 and 1428. The point of intersection 1816 is the intersection between the lines 1408 and 1426. The point of intersection 1818 is the intersection between the lines 1408 and 1428. Those points of intersection 1812 through 1818 are contained in a region without valid data.

The luminance value at the point of intersection 1812 is calculated by using equation (16).

$$p(x_i, y_j) = \frac{r_i(x_i; \hat{\alpha}_i, \hat{\beta}_i) + c_j(y_j; \hat{\gamma}_j, \hat{\delta}_j)}{2} \qquad (16)$$

The luminance value calculated by using equation (16) is the average of the function $r_i$ of the line 1406 and the function $c_j$ of the line 1426 at the point of intersection 1812 $(x_i, y_j)$. Similarly, the luminance value at the point of intersection 1814 is the average of the function $r_i$ of the line 1406 and the function $c_{j+1}$ of the line 1428 at the point of intersection 1814 $(x_{i+1}, y_j)$. The luminance value at the point of intersection 1816 is the average of the function $r_{i+1}$ of the line 1408 and the function $c_j$ of the line 1426 at the point of intersection 1816 $(x_i, y_{j+1})$. The luminance value at the point of intersection 1818 is the average of the function $r_{i+1}$ of the line 1408 and the function $c_{j+1}$ of the line 1428 at the point of intersection 1818 $(x_{i+1}, y_{j+1})$. In this manner, the pixel value of a pixel at a point of intersection is set as the average value of the function of the corresponding horizontal line and the function of the corresponding vertical line.

Then, the luminance value of a pixel which is not positioned at a point of intersection, e.g., the luminance value of a pixel positioned at an intermediate point 1922 shown in FIG. 19, is calculated by using equation (17).

$$p(x, y) = \Sigma W((x, y), (x_i, y_j)) p(x_i, y_j) \qquad (17)$$

In equation (17), the luminance value of the pixel at the intermediate point 1922 is calculated by using the luminance values of the pixels at the four points of intersection surrounding the intermediate point 1922. Accordingly, calculating the luminance value of a pixel which is not positioned at a point of intersection is performed after calculating the luminance values of the pixels at the surrounding points of intersection.

In equation (17), the position of the intermediate point 1922 is represented by $(x, y)$. $W((x, y), (x_i, y_j))$ on the right side is the distance weight. That is, $W((x, y), (x_i, y_j))$ is a weight that uses the distance from the intermediate point 1922 to each of the four points of intersection 1812, 1814, 1816, and 1818. The total of the weights of the four points of intersection is one, and the weight is the reciprocal of the distance. Accordingly, if the distances from the intermediate point 1922 to the four points of intersection 1812 through 1818 are equal to each other, the luminance value at the intermediate point 1922 is obtained by adding together ¼ of the luminance values at the points of intersection 1812 through 1818.

Then, the amount of fog is calculated by using equation (18):

$$\Delta(x, y) = p^* - p(x, y) \qquad (18)$$

where p* is the luminance value, which serves as a predetermined correction target value.

FIG. 20 illustrates a process of eliminating fog from an image, which is represented three-dimensionally. In FIG. 20, the x axis and the y axis designate a position in the image, and the z axis is a space representing the luminance value. Along the z axis, the gray plane is a fog image, which covers the entire image. The pale hatched plane designates the corrected luminance value of the image. As shown in FIG. 20, p* is the bright luminance value determined from the above-described luminance histogram. The luminance values at the individual points of intersection are increased to p*, thereby eliminating fog. FIG. 20 shows that the luminance at the intermediate point 1922 is being increased.

In step S916, the output module 160 outputs an image for which the luminance value has been corrected. For example, a printer prints the image from which fog has been eliminated.

Fourth Exemplary Embodiment

Figure 21:
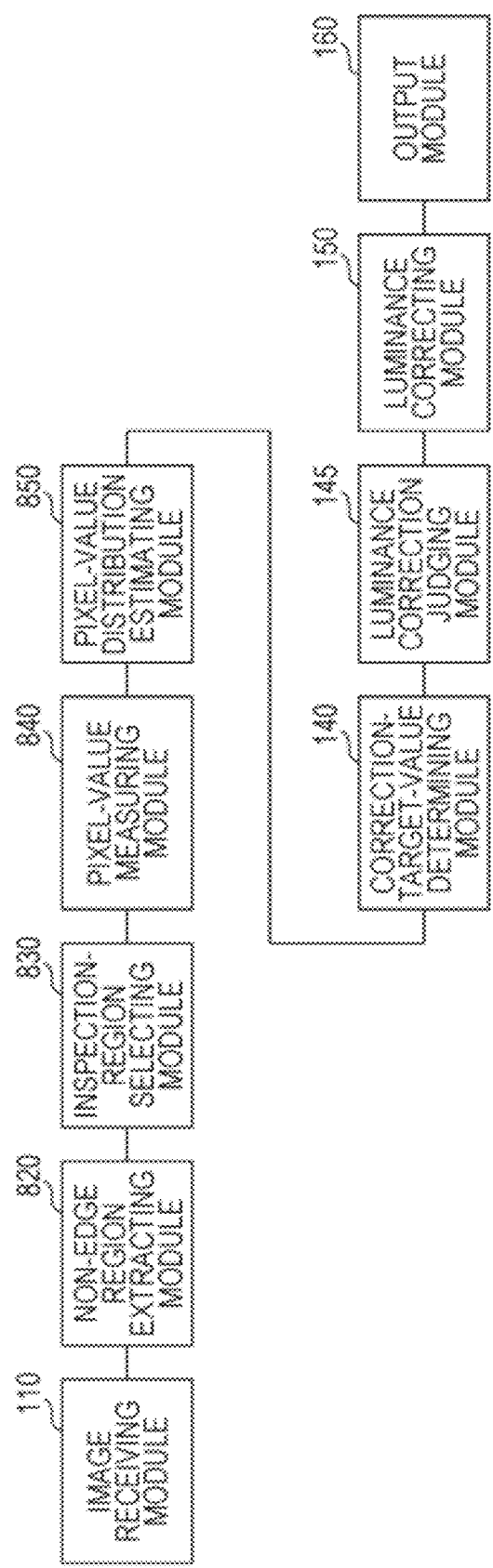
FIG. 21 is a block diagram illustrating conceptual modules forming an image processing apparatus according to a fourth exemplary embodiment.

FIG. 21 is a block diagram illustrating conceptual modules forming an image processing apparatus according to the fourth exemplary embodiment.

The image processing apparatus shown in FIG. 21 of the fourth exemplary embodiment serves the function to eliminate fog from images. The image processing apparatus shown in FIG. 21 includes by way of example an image receiving module 110, a non-edge region extracting module 820, an inspection-region selecting module 830, a pixel-value measuring module 840, a pixel-value distribution estimating module 850, a correction-target-value determining module 140, a luminance correction judging module 145, a luminance correcting module 150, and an output module 160.

The luminance correction judging module 145 is connected to the correction-target-value determining module 140 and the luminance correcting module 150. The luminance correction judging module 145 calculates an amount of fog on the basis of a function estimated by the pixel-value distribution estimating module 850, and judges whether to perform correction by using the luminance correcting module 150, on the basis of the difference between the amount of fog and a correction target value determined by the correction-target-value determining module 140.

The luminance correction judging module 145 may calculate an amount of fog on the basis of a function estimated by the pixel-value distribution estimating module 850, and may judge whether to perform correction by using the luminance correcting module 150 on the basis of the difference between the amounts of fog of pixels within the image received by the image receiving module 110.

The luminance correcting module 150 performs correction when the luminance correction judging module 145 judges that correction is to be performed.

FIG. 22 is a flowchart illustrating an example of processing according to the fourth exemplary embodiment.

In step S2202, the image receiving module 110 receives a subject image.

In step S2204, the non-edge region extracting module 820 extracts regions in which color values are changed smoothly and continuously.

In step S2206, the inspection-region selecting module 830 extracts a region suitable for estimating the gradient of fog.

In step S2208, the pixel-value measuring module 840 scans the lines of the region in accordance with a predetermined rule so as to measure the pixel values in the region.

In step S2210, the pixel-value distribution estimating module 850 estimates the gradient of degree of fog from a set of the measured pixel values.

In step S2212, the correction-target-value determining module 140 corrects a correction target value.

In step S2214, the luminance correction judging module 145 judges whether to perform luminance correction processing. If the result of step S2214 is YES, the process proceeds to step S2216. If the result of step S2214 is NO, the process proceeds to step S2218.

In step S2216, the luminance correcting module 150 corrects the luminance of the image.

In step S2218, the output module 160 outputs an image for which the luminance has been corrected.

In comparison with the third and fourth exemplary embodiments, a comparative example will be described below with reference to FIGS. 24C through 24F. Within the photographed image 2430 shown in FIG. 24C, a line 2432 is scanned, and the pixel values obtained as a result of scanning are represented by a graph shown in FIG. 24D. That is, since the fog image 2420 becomes darker toward the right side, the luminance value decreases toward the right side accordingly. However, the luminance values of the original image are also reflected in the pixel values shown in FIG. 24D, and thus, the luminance values are progressively changed, as indicated by luminance distributions 2442, 2444, 2446, and 2448. Then, if the luminance values are corrected toward the target value, as shown in FIG. 24F, the resulting image is seen as a corrected image 2440 shown in FIG. 24E. In the corrected image 2440, in a portion without a white background, such as in the region 2412, the luminance becomes too bright so that the original red color has been removed. The reason for this phenomenon is as follows. The target for the correction processing in this comparative example is a paper document, which is entirely white. However, this correction processing is uniformly performed on a document containing a color portion and a white background, despite the fact that the luminance value of a chromatic color portion is lower than that of a white background.

In contrast, in the third and fourth exemplary embodiments, the region 2414 is selected, and on the basis of the region 2414, the amount of fog is calculated, thereby correcting the luminance values of the image. As a result, the luminance of a portion without a white background, such as the region 2412, does not become too bright in contrast to the corrected image 2440 shown in FIG. 24E.

An example of the hardware configuration of the image processing apparatus according to the exemplary embodiments will be described below with reference to FIG. 25. The hardware configuration shown in FIG. 25 may be constituted of a personal computer (PC), and includes a data reading device 2517, such as a scanner, and a data output device 2518, such as a printer.

A CPU 2501 is a controller that executes processing in accordance with a computer program in which execution sequences of individual modules, such as the amount-of-fog estimating module 120, the pixel-value measuring module 130, the correction-target-value determining module 140, the luminance correcting module 150, the luminance correction judging module 145, the non-edge region extracting module 820, the inspection-region selecting module 830, the pixel-value measuring module 840, and the pixel-value distribution estimating module 850, are described.

A read only memory (ROM) 2502 stores therein programs, computation parameters, etc. used by the CPU 2501. A RAM 2503 stores therein programs used by the execution of the CPU 2501 and parameters that are appropriately changed in the execution of the CPU 2501. The CPU 2501, the ROM 2502, and the RAM 2503 are connected to one another via a host bus 2504, such as a CPU bus.

The host bus 2504 is connected to an external bus 2506, such as a peripheral component interconnect (PCI)/interface bus, via a bridge 2505.

A keyboard 2508 and a pointing device 2509, such as a mouse, are input devices operated by an operator. A display 2510 includes a liquid crystal display (LCD) or a cathode ray tube (CRT), and displays various information as text or image information.

A hard disk drive (HDD) 2511 has a built-in hard disk and drives the hard disk to cause it to record or play back programs executed by the CPU 2501 or information. In the hard disk, received images, estimated amounts of fog, measured pixel values, determined correction target values, images of extracted regions, estimated functions, etc. are stored. Additionally, various computer programs, such as various data processing programs, are also stored.

A drive 2512 reads data or a program recorded on a removable recording medium 2513, such as a magnetic disk, an optical disc, a magneto-optical disk, or a semiconductor memory, set in the drive 2512, and supplies the read data or program to the RAM 2503, which is connected to the drive 2512 via an interface 2507, the external bus 2506, the bridge 2505, and the host bus 2504. The removable recording medium 2513 is also usable as a data recording area, which is similar to a hard disk.

A connection port 2514 is a port for connecting an external connection device 2515 to the image processing apparatus, and includes a connecting section, such as a universal serial bus (USB) or IEEE-1394 port. The connection port 2514 is connected to the CPU 2501 via the interface 2507, the external bus 2506, the bridge 2505, and the host bus 2504. A communication device 2516 is connected to a network, and performs data communication processing with external devices. The data reading device 2517 is, for example, a scanner, and reads documents. The data output device 2518 is, for example, a printer, and outputs documents.

The hardware configuration shown in FIG. 25 is an example only, and any configuration may be employed for the image processing apparatus as long as it can execute the modules described in the exemplary embodiments. For example, some of the modules may be constituted of dedicated hardware, such as an application specific integrated circuit (ASIC), or may be contained in an external system and connected to the image processing apparatus via a communication circuit. Alternatively, two or more of the systems shown in FIG. 25 may be connected via a communication circuit and operated in cooperation with one another. The system may be integrated in a copying machine, a fax machine, a scanner, a printer, a multifunction device (an image processing apparatus including two or more functions of a scanner, a printer, a copying machine, a fax machine, etc.)

The above-described exemplary embodiments may be combined. For example, modules of one exemplary embodiment may be added to another exemplary embodiment, or some modules of one exemplary embodiment may be exchanged for some modules of another exemplary embodiment.

The above-described program may be stored in a recording medium and be provided. The program recorded on a recording medium may be provided via a communication medium.

In this case, the above-described program may be implemented as a "computer readable medium storing the program therein" in an exemplary embodiment of the invention.

The "computer readable medium storing a program therein" is a recording medium storing a program therein that can be read by a computer, and is used for installing, executing, and distributing the program.

Examples of the recording medium include digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered), a magneto-optical disk (MO), a flexible disk (FD), magnetic tape, a hard disk, a ROM, an electrically erasable programmable read only memory (EEPROM) (registered), a flash memory, a RAM, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination such networks. The program may be transmitted by using carrier waves.

The above-described program may be part of another program, or may be recorded, together with another program, on a recording medium. The program may be divided and recorded on plural recording media. Further, the program may be recorded in any form, e.g., it may be compressed or encrypted, as long as it can be reconstructed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a receiving device that receives an image;
   an estimating device that estimates, for each pixel within the image received by the receiving device, using the image received by the receiving device, an amount of fog, which is a difference between a luminance value of the pixel and an original luminance value of the pixel;
   a measuring device that measures, for each pixel within the image received by the receiving device, the luminance value of the pixel;
   a determining device that determines a correction target value for luminance values of pixels of a background portion within the image received by the receiving device; and
   a correcting device that corrects the luminance value of each pixel measured by the measuring device using the amount of fog estimated by the estimating device and the correction target value determined by the determining device,
   wherein the correcting device sets, as a basic amount of correction, a difference between the amount of fog estimated by the estimating device and the correction target value determined by the determining device, and changes the basic amount of correction by using a coefficient which uses a difference between the luminance value measured by the measuring device and the amount of fog, so as to correct the luminance value measured by the measuring device using the changed basic amount of correction.

2. The image processing apparatus according to claim 1, wherein the correcting device sets the coefficient such that, as the difference between the luminance value measured by the measuring device and the amount of fog increases, the basic amount of correction decreases.

3. The image processing apparatus according to claim 1, wherein in response to the difference between the luminance value measured by the measuring device and the amount of fog being equal to or greater than a predetermined threshold or the difference being greater than the predetermined threshold, the correcting device does not correct the luminance value measured by the measuring device.

4. The image processing apparatus according to claim 1, wherein the correcting device changes the basic amount of correction by using a coefficient which uses the basic amount of correction and the difference between the luminance value measured by the measuring device and the amount of fog.

5. The image processing apparatus according to claim 1, further comprising:
   a judging device that judges, using a difference between the amount of fog, estimated by the estimating device, of each pixel within the image received by the receiving device, whether to correct the luminance value of each pixel by using the correcting device,
   wherein the correcting device corrects the luminance value of each pixel in response to the judging device judging that the luminance value is to be corrected.

6. An image processing method comprising:
   receiving an image;
   estimating, for each pixel within the received image, using the received image, an amount of fog, which is a difference between a luminance value of the pixel and an original luminance value of the pixel;
   measuring, for each pixel within the received image, the luminance value of the pixel;
   determining a correction target value for luminance values of pixels of a background portion within the received image;
   correcting the measured luminance value of each pixel using the estimated amount of fog and the determined correction target value;
   setting, as basic amount of correction, a difference between the estimated amount of fog and the determined correction target value; and
   changing the basic amount of correction by using a coefficient which uses a difference between the measured luminance value and the estimated amount of fog, so as to correct the measured luminance value using the changed basic amount of correction.

7. A non-transitory computer readable medium storing a program causing a computer to execute a process, the process comprising:
   receiving an image;
   estimating, for each pixel within the received image, using the received image, an amount of fog, which is a difference between a luminance value of the pixel and an original luminance value of the pixel;

measuring, for each pixel within the received image, the luminance value of the pixel;

determining a correction target value for luminance values of pixels of a background portion within the received image;

correcting the measured luminance value of each pixel using the estimated amount of fog and the determined correction target value;

setting, as basic amount of correction, a difference between the estimated amount of fog and the determined correction target value; and changing the basic amount of correction by using a coefficient which uses a difference between the measured luminance value and the estimated amount of fog, so as to correct the measured luminance value using the changed basic amount of correction.

8. An image processing apparatus comprising:

a receiving device that receives an image;

an estimating device that estimates, for each pixel within the image received by the receiving device, using the image received by the receiving device, an amount of fog, which is a difference between a luminance value of the pixel and an original luminance value of the pixel;

a measuring device that measures, for each pixel within the image received by the receiving device, the luminance value of the pixel;

a determining device that determines a correction target value for luminance values of pixels of a background portion within the image received by the receiving device;

a correcting device that corrects the luminance value of each pixel measured by the measuring device using the amount of fog estimated by the estimating device and the correction target value determined by the determining device; and a judging device that judges, using a difference between the amount of fog estimated by the estimating device and the correction target value determined by the determining device, whether to correct the luminance value of each pixel by using the correcting device, wherein the correcting device corrects the luminance value of each pixel in response to the judging device judging that the luminance value is to be corrected.

* * * * *